US010761657B2

(12) United States Patent
Christiansson et al.

(10) Patent No.: US 10,761,657 B2
(45) Date of Patent: Sep. 1, 2020

(54) AUTOMATIC OPTIMISATION OF TOUCH SIGNAL

(71) Applicant: FlatFrog Laboratories AB, Lund (SE)

(72) Inventors: Tomas Christiansson, Torna-Hällestad (SE); Henrik Wall, Dalby (SE); Nicklas Ohlsson, Bunkeflostrand (SE); Mattias Krus, Lund (SE); Tomas Svensson, Limhamn (SE)

(73) Assignee: FlatFrog Laboratories AB, Lund (SE)

( * ) Notice: Subject to any disclaimer, the term of this patent is extended or adjusted under 35 U.S.C. 154(b) by 0 days.

(21) Appl. No.: 16/461,241

(22) PCT Filed: Nov. 17, 2017

(86) PCT No.: PCT/IB2017/057201
§ 371 (c)(1),
(2) Date: May 15, 2019

(87) PCT Pub. No.: WO2018/096430
PCT Pub. Date: May 31, 2018

(65) Prior Publication Data
US 2019/0317640 A1 Oct. 17, 2019

(30) Foreign Application Priority Data
Nov. 24, 2016 (SE) ...................... 1630274

(51) Int. Cl.
G06F 3/042 (2006.01)
(52) U.S. Cl.
CPC .......... G06F 3/0421 (2013.01); G06F 3/0428 (2013.01)
(58) Field of Classification Search
CPC ......... G06F 2203/04109; G06F 3/0428; G06F 3/042; G06F 3/0416; G06F 3/0421;
(Continued)

(56) References Cited
U.S. PATENT DOCUMENTS
3,440,426 A 4/1969 Bush
3,553,680 A 1/1971 Cooreman
(Continued)

FOREIGN PATENT DOCUMENTS
AU 2008 280 952 A1 3/2009
CN 201233592 Y 5/2009
(Continued)

OTHER PUBLICATIONS
International Search Report for International App. No. PCT/IB2017/057201, dated Mar. 6, 2018, in 4 pages.
The Laser Wall, MIT, 1997, http://web.media.mit.edu/~joep/SpectrumWeb/captions/Laser.html.
(Continued)

Primary Examiner — Dmitriy Bolotin
(74) Attorney, Agent, or Firm — Knobbe Martens Olson & Bear, LLP

(57) ABSTRACT
A method of operating an optical touch apparatus is described wherein, the optical touch apparatus comprising a panel, a plurality of emitters and a plurality of detectors arranged with respect to the panel, the plurality of detectors configured to receive light from the plurality of emitters thereby defining detection samples of light transmitted between pairs of emitters and detectors. The optical touch apparatus being further configured to operate in an ambient light evaluation mode comprising the steps of: generating a first set of samples over a first integration time and a second set of samples over a second integration time using at least one detector, and applying a filter to at least the first and second set of samples to generate a residual ambient light value indicative of ambient light noise, wherein the touch apparatus is configured to perform the following steps: operating according to the ambient light evaluation mode for a plurality of repetitions.

23 Claims, 21 Drawing Sheets

(58) Field of Classification Search
CPC .......... H01S 5/423; G09G 2300/0452; G09G 2320/0242; G09G 2320/043; G09G 3/32; H01L 2251/5369; H01L 27/3213; H01L 27/3218; H01L 27/322; H01L 27/323; H01L 51/5262; H01L 51/5271
See application file for complete search history.

(56) References Cited

U.S. PATENT DOCUMENTS

| | | |
|---|---|---|
| 3,673,327 A | 6/1972 | Johnson et al. |
| 4,129,384 A | 12/1978 | Walker et al. |
| 4,180,702 A | 12/1979 | Sick et al. |
| 4,209,255 A | 6/1980 | Heynau et al. |
| 4,213,707 A | 7/1980 | Evans, Jr. |
| 4,254,333 A | 3/1981 | Bergström |
| 4,254,407 A | 3/1981 | Tipon |
| 4,294,543 A | 10/1981 | Apple et al. |
| 4,346,376 A | 8/1982 | Mallos |
| 4,420,261 A | 12/1983 | Barlow et al. |
| 4,484,179 A | 11/1984 | Kasday |
| 4,507,557 A | 3/1985 | Tsikos |
| 4,521,112 A | 6/1985 | Kuwabara et al. |
| 4,542,375 A | 9/1985 | Alles et al. |
| 4,550,250 A | 10/1985 | Mueller et al. |
| 4,593,191 A | 6/1986 | Alles |
| 4,673,918 A | 6/1987 | Adler et al. |
| 4,688,933 A | 8/1987 | Lapeyre |
| 4,688,993 A | 8/1987 | Ferris et al. |
| 4,692,809 A | 9/1987 | Beining et al. |
| 4,710,760 A | 12/1987 | Kasday |
| 4,736,191 A | 4/1988 | Matzke et al. |
| 4,737,626 A | 4/1988 | Hasegawa |
| 4,746,770 A | 5/1988 | McAvinney |
| 4,752,655 A | 6/1988 | Tajiri et al. |
| 4,772,763 A | 9/1988 | Garwin et al. |
| 4,782,328 A | 11/1988 | Denlinger |
| 4,812,833 A | 3/1989 | Shimauchi |
| 4,837,430 A | 6/1989 | Hasegawa |
| 4,868,912 A | 9/1989 | Doering |
| 4,891,829 A | 1/1990 | Deckman et al. |
| 4,916,712 A | 4/1990 | Bender |
| 4,933,544 A | 6/1990 | Tamaru |
| 4,949,079 A | 8/1990 | Loebner |
| 4,986,662 A | 1/1991 | Bures |
| 4,988,983 A | 1/1991 | Wehrer |
| 5,065,185 A | 11/1991 | Powers et al. |
| 5,073,770 A | 12/1991 | Lowbner |
| 5,105,186 A | 4/1992 | May |
| 5,159,322 A | 10/1992 | Loebner |
| 5,166,668 A | 11/1992 | Aoyagi |
| 5,227,622 A | 7/1993 | Suzuki |
| 5,248,856 A | 9/1993 | Mallicoat |
| 5,254,407 A | 10/1993 | Sergerie et al. |
| 5,345,490 A | 9/1994 | Finnigan et al. |
| 5,383,022 A | 1/1995 | Kaser |
| 5,483,261 A | 1/1996 | Yasutake |
| 5,484,966 A | 1/1996 | Segen |
| 5,499,098 A | 3/1996 | Ogawa |
| 5,502,568 A | 3/1996 | Ogawa et al. |
| 5,525,764 A | 6/1996 | Junkins et al. |
| 5,526,422 A | 6/1996 | Keen |
| 5,539,514 A | 7/1996 | Shishido et al. |
| 5,570,181 A | 10/1996 | Yasuo et al. |
| 5,572,251 A | 11/1996 | Ogawa |
| 5,577,501 A | 11/1996 | Flohr et al. |
| 5,600,105 A | 2/1997 | Fukuzaki et al. |
| 5,608,550 A | 3/1997 | Epstein et al. |
| 5,672,852 A | 9/1997 | Fukuzaki et al. |
| 5,679,930 A | 10/1997 | Katsurahira |
| 5,686,942 A | 11/1997 | Ball |
| 5,688,933 A | 11/1997 | Evans et al. |
| 5,729,249 A | 3/1998 | Yasutake |
| 5,736,686 A | 4/1998 | Perret, Jr. et al. |
| 5,740,224 A | 4/1998 | Müller et al. |
| 5,764,223 A | 6/1998 | Chang et al. |
| 5,767,517 A | 6/1998 | Hawkins |
| 5,775,792 A | 7/1998 | Wiese |
| 5,945,980 A | 8/1999 | Moissev et al. |
| 5,945,981 A | 8/1999 | Paull et al. |
| 5,959,617 A | 9/1999 | Bird et al. |
| 6,061,177 A | 5/2000 | Fujimoto |
| 6,067,079 A | 5/2000 | Shieh |
| 6,122,394 A | 9/2000 | Neukermans et al. |
| 6,141,104 A | 10/2000 | Schulz et al. |
| 6,172,667 B1 | 1/2001 | Sayag |
| 6,175,999 B1 | 1/2001 | Sloan et al. |
| 6,227,667 B1 | 5/2001 | Halldorsson et al. |
| 6,229,529 B1 | 5/2001 | Yano et al. |
| 6,333,735 B1 | 12/2001 | Anvekar |
| 6,366,276 B1 | 4/2002 | Kunimatsu et al. |
| 6,380,732 B1 | 4/2002 | Gilboa |
| 6,380,740 B1 | 4/2002 | Laub |
| 6,390,370 B1 | 5/2002 | Plesko |
| 6,429,857 B1 | 8/2002 | Masters et al. |
| 6,452,996 B1 | 9/2002 | Hsieh |
| 6,476,797 B1 | 11/2002 | Kurihara et al. |
| 6,492,633 B2 | 12/2002 | Nakazawa et al. |
| 6,495,832 B1 | 12/2002 | Kirby |
| 6,504,143 B2 | 1/2003 | Koops et al. |
| 6,529,327 B1 | 3/2003 | Graindorge |
| 6,538,644 B1 | 3/2003 | Muraoka |
| 6,587,099 B2 | 7/2003 | Takekawa |
| 6,648,485 B1 | 11/2003 | Colgan et al. |
| 6,660,964 B1 | 12/2003 | Benderly |
| 6,664,498 B2 | 12/2003 | Forsman et al. |
| 6,664,952 B2 | 12/2003 | Iwamoto et al. |
| 6,690,363 B2 | 2/2004 | Newton |
| 6,707,027 B2 | 3/2004 | Liess et al. |
| 6,738,051 B2 | 5/2004 | Boyd et al. |
| 6,748,098 B1 | 6/2004 | Rosenfeld |
| 6,784,948 B2 | 8/2004 | Kawashima et al. |
| 6,799,141 B1 | 9/2004 | Stoustrup et al. |
| 6,806,871 B1 | 10/2004 | Yasue |
| 6,927,384 B2 | 8/2005 | Reime et al. |
| 6,940,286 B2 | 9/2005 | Wang et al. |
| 6,965,836 B2 | 11/2005 | Richardson |
| 6,972,753 B1 | 12/2005 | Kimura et al. |
| 6,985,137 B2 | 1/2006 | Kaikuranta |
| 7,042,444 B2 | 5/2006 | Cok |
| 7,084,859 B1 | 8/2006 | Pryor |
| 7,087,907 B1 | 8/2006 | Lalovic et al. |
| 7,133,031 B2 | 11/2006 | Wang et al. |
| 7,176,904 B2 | 2/2007 | Satoh |
| 7,199,932 B2 | 4/2007 | Sugiura |
| 7,359,041 B2 | 4/2008 | Xie et al. |
| 7,397,418 B1 | 7/2008 | Doerry et al. |
| 7,432,893 B2 | 10/2008 | Ma et al. |
| 7,435,940 B2 | 10/2008 | Eliasson et al. |
| 7,436,443 B2 | 10/2008 | Hirunuma et al. |
| 7,442,914 B2 | 10/2008 | Eliasson et al. |
| 7,465,914 B2 | 12/2008 | Eliasson et al. |
| 7,613,375 B2 | 11/2009 | Shimizu |
| 7,629,968 B2 | 12/2009 | Miller et al. |
| 7,646,833 B1 | 1/2010 | He et al. |
| 7,653,883 B2 | 1/2010 | Hotelling et al. |
| 7,655,901 B2 | 2/2010 | Idzik et al. |
| 7,705,835 B2 | 4/2010 | Eikman |
| 7,729,056 B2 | 6/2010 | Hwang et al. |
| 7,847,789 B2 | 12/2010 | Kolmykov-Zotov et al. |
| 7,855,716 B2 | 12/2010 | McCreary et al. |
| 7,859,519 B2 | 12/2010 | Tulbert |
| 7,924,272 B2 | 4/2011 | Boer et al. |
| 7,932,899 B2 | 4/2011 | Newton et al. |
| 7,969,410 B2 | 6/2011 | Kakarala |
| 7,995,039 B2 | 8/2011 | Eliasson et al. |
| 8,013,845 B2 | 9/2011 | Ostergaard et al. |
| 8,031,186 B2 | 10/2011 | Ostergaard |
| 8,077,147 B2 | 12/2011 | Krah et al. |
| 8,093,545 B2 | 1/2012 | Leong et al. |
| 8,094,136 B2 | 1/2012 | Eliasson et al. |
| 8,094,910 B2 | 1/2012 | Xu |
| 8,149,211 B2 | 4/2012 | Hayakawa et al. |
| 8,218,154 B2 | 7/2012 | Østergaard et al. |
| 8,274,495 B2 | 9/2012 | Lee |

(56) References Cited

U.S. PATENT DOCUMENTS

| | | |
|---|---|---|
| 8,325,158 B2 | 12/2012 | Yatsuda et al. |
| 8,339,379 B2 | 12/2012 | Goertz et al. |
| 8,350,827 B2 | 1/2013 | Chung et al. |
| 8,384,010 B2 | 2/2013 | Hong et al. |
| 8,407,606 B1 | 3/2013 | Davidson et al. |
| 8,441,467 B2 | 5/2013 | Han |
| 8,445,834 B2 | 5/2013 | Hong et al. |
| 8,466,901 B2 | 6/2013 | Yen et al. |
| 8,482,547 B2 | 7/2013 | Cobon et al. |
| 8,542,217 B2 | 9/2013 | Wassvik et al. |
| 8,567,257 B2 | 10/2013 | Van Steenberge et al. |
| 8,581,884 B2 | 11/2013 | Fåhraeus et al. |
| 8,624,858 B2 | 1/2014 | Fyke et al. |
| 8,686,974 B2 | 4/2014 | Christiansson et al. |
| 8,692,807 B2 | 4/2014 | Føhraeus et al. |
| 8,716,614 B2 | 5/2014 | Wassvik |
| 8,727,581 B2 | 5/2014 | Saccomanno |
| 8,745,514 B1 | 6/2014 | Davidson |
| 8,780,066 B2 | 7/2014 | Christiansson et al. |
| 8,830,181 B1 | 9/2014 | Clark et al. |
| 8,860,696 B2 | 10/2014 | Wassvik et al. |
| 8,872,098 B2 | 10/2014 | Bergström et al. |
| 8,872,801 B2 | 10/2014 | Bergström et al. |
| 8,884,900 B2 | 11/2014 | Wassvik |
| 8,890,843 B2 | 11/2014 | Wassvik et al. |
| 8,890,849 B2 | 11/2014 | Christiansson et al. |
| 8,928,590 B1 | 1/2015 | El Dokor |
| 8,963,886 B2 | 2/2015 | Wassvik |
| 8,982,084 B2 | 3/2015 | Christiansson et al. |
| 9,024,916 B2 | 5/2015 | Christiansson |
| 9,035,909 B2 | 5/2015 | Christiansson |
| 9,063,614 B2 | 6/2015 | Petterson et al. |
| 9,063,617 B2 | 6/2015 | Eliasson et al. |
| 9,086,763 B2 | 7/2015 | Johansson et al. |
| 9,134,854 B2 | 9/2015 | Wassvik et al. |
| 9,158,401 B2 | 10/2015 | Christiansson |
| 9,158,415 B2 | 10/2015 | Song et al. |
| 9,201,520 B2 | 12/2015 | Benko et al. |
| 9,213,445 B2 | 12/2015 | King et al. |
| 9,274,645 B2 | 3/2016 | Christiansson et al. |
| 9,280,237 B2 | 3/2016 | Kukulj |
| 9,317,168 B2 | 4/2016 | Christiansson et al. |
| 9,323,396 B2 | 4/2016 | Han et al. |
| 9,366,565 B2 | 6/2016 | Uvnäs |
| 9,377,884 B2 | 6/2016 | Christiansson et al. |
| 9,389,732 B2 | 7/2016 | Craven-Bartle |
| 9,411,444 B2 | 8/2016 | Christiansson et al. |
| 9,411,464 B2 | 8/2016 | Wallander et al. |
| 9,430,079 B2 | 8/2016 | Christiansson et al. |
| 9,442,574 B2 | 9/2016 | Fåhraeus et al. |
| 9,547,393 B2 | 1/2017 | Christiansson et al. |
| 9,552,103 B2 | 1/2017 | Craven-Bartle et al. |
| 9,557,846 B2 | 1/2017 | Baharav et al. |
| 9,588,619 B2 | 3/2017 | Christiansson et al. |
| 9,594,467 B2 | 3/2017 | Christiansson et al. |
| 9,618,682 B2 | 4/2017 | Yoon et al. |
| 9,626,018 B2 | 4/2017 | Christiansson et al. |
| 9,626,040 B2 | 4/2017 | Wallander et al. |
| 9,639,210 B2 | 5/2017 | Wallander et al. |
| 9,678,602 B2 | 6/2017 | Wallander |
| 9,684,414 B2 | 6/2017 | Christiansson et al. |
| 9,710,101 B2 | 7/2017 | Christiansson et al. |
| 9,874,978 B2 | 1/2018 | Wall |
| 10,013,107 B2 | 7/2018 | Christiansson et al. |
| 10,019,113 B2 | 7/2018 | Christiansson et al. |
| 2001/0002694 A1 | 6/2001 | Nakazawa et al. |
| 2001/0005004 A1 | 6/2001 | Shiratsuki et al. |
| 2001/0005308 A1 | 6/2001 | Oishi et al. |
| 2001/0030642 A1 | 10/2001 | Sullivan et al. |
| 2002/0067348 A1 | 6/2002 | Masters et al. |
| 2002/0075243 A1 | 6/2002 | Newton |
| 2002/0118177 A1 | 8/2002 | Newton |
| 2002/0158823 A1 | 10/2002 | Zavracky et al. |
| 2002/0158853 A1 | 10/2002 | Sugawara et al. |
| 2002/0163505 A1 | 11/2002 | Takekawa |
| 2003/0016450 A1 | 1/2003 | Bluemel et al. |
| 2003/0034439 A1 | 2/2003 | Reime et al. |
| 2003/0034935 A1 | 2/2003 | Amanai et al. |
| 2003/0048257 A1 | 3/2003 | Mattila |
| 2003/0052257 A1 | 3/2003 | Sumriddetchkajorn |
| 2003/0095399 A1 | 5/2003 | Grenda et al. |
| 2003/0107748 A1 | 6/2003 | Lee |
| 2003/0137494 A1 | 7/2003 | Tulbert |
| 2003/0156100 A1 | 8/2003 | Gettemy |
| 2003/0160155 A1 | 8/2003 | Liess |
| 2003/0210537 A1 | 11/2003 | Engelmann |
| 2003/0214486 A1 | 11/2003 | Roberts |
| 2004/0027339 A1 | 2/2004 | Schulz |
| 2004/0032401 A1 | 2/2004 | Nakazawa et al. |
| 2004/0090432 A1 | 5/2004 | Takahashi et al. |
| 2004/0130338 A1 | 7/2004 | Wang et al. |
| 2004/0174541 A1 | 9/2004 | Freifeld |
| 2004/0201579 A1 | 10/2004 | Graham |
| 2004/0212603 A1 | 10/2004 | Cok |
| 2004/0238627 A1 | 12/2004 | Silverbrook et al. |
| 2004/0239702 A1 | 12/2004 | Kang et al. |
| 2004/0245438 A1 | 12/2004 | Payne et al. |
| 2004/0252091 A1 | 12/2004 | Ma et al. |
| 2004/0252867 A1 | 12/2004 | Lan et al. |
| 2005/0012714 A1 | 1/2005 | Russo et al. |
| 2005/0041013 A1 | 2/2005 | Tanaka |
| 2005/0057903 A1 | 3/2005 | Choi |
| 2005/0073508 A1 | 4/2005 | Pittel et al. |
| 2005/0083293 A1 | 4/2005 | Dixon |
| 2005/0128190 A1 | 6/2005 | Ryynanen |
| 2005/0143923 A1 | 6/2005 | Keers et al. |
| 2005/0156914 A1 | 7/2005 | Lipman et al. |
| 2005/0162398 A1 | 7/2005 | Eliasson et al. |
| 2005/0179977 A1 | 8/2005 | Chui et al. |
| 2005/0200613 A1 | 9/2005 | Kobayashi et al. |
| 2005/0212774 A1 | 9/2005 | Ho et al. |
| 2005/0248540 A1 | 11/2005 | Newton |
| 2005/0253834 A1 | 11/2005 | Sakamaki et al. |
| 2005/0276053 A1 | 12/2005 | Nortrup et al. |
| 2006/0001650 A1 | 1/2006 | Robbins et al. |
| 2006/0001653 A1 | 1/2006 | Smits |
| 2006/0007185 A1 | 1/2006 | Kobayashi |
| 2006/0008164 A1 | 1/2006 | Wu et al. |
| 2006/0017706 A1 | 1/2006 | Cutherell et al. |
| 2006/0017709 A1 | 1/2006 | Okano |
| 2006/0033725 A1 | 2/2006 | Marggraff et al. |
| 2006/0038698 A1 | 2/2006 | Chen |
| 2006/0061861 A1 | 3/2006 | Munro et al. |
| 2006/0114237 A1 | 6/2006 | Crockett et al. |
| 2006/0132454 A1 | 6/2006 | Chen et al. |
| 2006/0139340 A1 | 6/2006 | Geaghan |
| 2006/0158437 A1 | 7/2006 | Blythe et al. |
| 2006/0170658 A1 | 8/2006 | Nakamura et al. |
| 2006/0202974 A1 | 9/2006 | Thielman |
| 2006/0227120 A1 | 10/2006 | Eikman |
| 2006/0255248 A1 | 11/2006 | Eliasson |
| 2006/0256092 A1 | 11/2006 | Lee |
| 2006/0279558 A1 | 12/2006 | Van Delden et al. |
| 2006/0281543 A1 | 12/2006 | Sutton et al. |
| 2006/0290684 A1 | 12/2006 | Giraldo et al. |
| 2007/0014486 A1 | 1/2007 | Schiwietz et al. |
| 2007/0024598 A1 | 2/2007 | Miller et al. |
| 2007/0034783 A1 | 2/2007 | Eliasson et al. |
| 2007/0038691 A1 | 2/2007 | Candes et al. |
| 2007/0052684 A1 | 3/2007 | Gruhlke et al. |
| 2007/0070056 A1 | 3/2007 | Sato et al. |
| 2007/0075648 A1 | 4/2007 | Blythe et al. |
| 2007/0120833 A1 | 5/2007 | Yamaguchi et al. |
| 2007/0125937 A1 | 6/2007 | Eliasson et al. |
| 2007/0152985 A1 | 7/2007 | Ostergaard et al. |
| 2007/0201042 A1 | 8/2007 | Eliasson et al. |
| 2007/0296688 A1 | 12/2007 | Nakamura et al. |
| 2008/0006766 A1 | 1/2008 | Oon et al. |
| 2008/0007540 A1 | 1/2008 | Ostergaard |
| 2008/0007541 A1 | 1/2008 | Eliasson et al. |
| 2008/0007542 A1 | 1/2008 | Eliasson et al. |
| 2008/0011944 A1 | 1/2008 | Chua et al. |
| 2008/0029691 A1 | 2/2008 | Han |
| 2008/0036743 A1 | 2/2008 | Westerman et al. |

(56) References Cited

U.S. PATENT DOCUMENTS

| | | |
|---|---|---|
| 2008/0062150 A1 | 3/2008 | Lee |
| 2008/0068691 A1 | 3/2008 | Miyatake |
| 2008/0074401 A1 | 3/2008 | Chung et al. |
| 2008/0088603 A1 | 4/2008 | Eliasson et al. |
| 2008/0121442 A1 | 5/2008 | Boer et al. |
| 2008/0122792 A1 | 5/2008 | Izadi et al. |
| 2008/0122803 A1 | 5/2008 | Izadi et al. |
| 2008/0130979 A1 | 6/2008 | Run et al. |
| 2008/0133265 A1 | 6/2008 | Silkaitis et al. |
| 2008/0150846 A1 | 6/2008 | Chung et al. |
| 2008/0150848 A1 | 6/2008 | Chung et al. |
| 2008/0151126 A1 | 6/2008 | Yu |
| 2008/0158176 A1 | 7/2008 | Land et al. |
| 2008/0189046 A1 | 8/2008 | Eliasson et al. |
| 2008/0192025 A1 | 8/2008 | Jaeger et al. |
| 2008/0238433 A1 | 10/2008 | Joutsenoja et al. |
| 2008/0246388 A1 | 10/2008 | Cheon et al. |
| 2008/0252619 A1 | 10/2008 | Crockett et al. |
| 2008/0266266 A1 | 10/2008 | Kent et al. |
| 2008/0278460 A1 | 11/2008 | Arnett et al. |
| 2008/0284925 A1 | 11/2008 | Han |
| 2008/0291668 A1 | 11/2008 | Aylward et al. |
| 2008/0297482 A1 | 12/2008 | Weiss |
| 2009/0000831 A1 | 1/2009 | Miller et al. |
| 2009/0002340 A1 | 1/2009 | Van Genechten |
| 2009/0006292 A1 | 1/2009 | Block |
| 2009/0040786 A1 | 2/2009 | Mori |
| 2009/0066647 A1 | 3/2009 | Kerr et al. |
| 2009/0067178 A1 | 3/2009 | Huang et al. |
| 2009/0073142 A1 | 3/2009 | Yamashita et al. |
| 2009/0077501 A1 | 3/2009 | Partridge et al. |
| 2009/0085894 A1 | 4/2009 | Gandhi et al. |
| 2009/0091554 A1 | 4/2009 | Keam |
| 2009/0115919 A1 | 5/2009 | Tanaka et al. |
| 2009/0122020 A1 | 5/2009 | Eliasson et al. |
| 2009/0122027 A1 | 5/2009 | Newton |
| 2009/0128508 A1 | 5/2009 | Sohn et al. |
| 2009/0135162 A1 | 5/2009 | Van De Wijdeven et al. |
| 2009/0143141 A1 | 6/2009 | Wells et al. |
| 2009/0153519 A1 | 6/2009 | Suarez Rovere |
| 2009/0161026 A1 | 6/2009 | Wu et al. |
| 2009/0168459 A1 | 7/2009 | Holman et al. |
| 2009/0187842 A1 | 7/2009 | Collins et al. |
| 2009/0189857 A1 | 7/2009 | Benko et al. |
| 2009/0189874 A1 | 7/2009 | Chene et al. |
| 2009/0189878 A1* | 7/2009 | Goertz ............... G06F 3/0425 345/175 |
| 2009/0219256 A1 | 9/2009 | Newton |
| 2009/0229892 A1 | 9/2009 | Fisher et al. |
| 2009/0251439 A1 | 10/2009 | Westerman et al. |
| 2009/0256817 A1 | 10/2009 | Perlin et al. |
| 2009/0259967 A1 | 10/2009 | Davidson et al. |
| 2009/0267919 A1 | 10/2009 | Chao et al. |
| 2009/0273794 A1 | 11/2009 | Østergaard et al. |
| 2009/0278816 A1 | 11/2009 | Colson |
| 2009/0297009 A1 | 12/2009 | Xu et al. |
| 2010/0033444 A1 | 2/2010 | Kobayashi |
| 2010/0045629 A1 | 2/2010 | Newton |
| 2010/0060896 A1 | 3/2010 | Van De Wijdeven et al. |
| 2010/0066016 A1 | 3/2010 | Van De Wijdeven et al. |
| 2010/0066704 A1 | 3/2010 | Kasai |
| 2010/0073318 A1 | 3/2010 | Hu et al. |
| 2010/0078545 A1 | 4/2010 | Leong et al. |
| 2010/0079407 A1 | 4/2010 | Suggs et al. |
| 2010/0079408 A1 | 4/2010 | Leong et al. |
| 2010/0097345 A1 | 4/2010 | Jang et al. |
| 2010/0097348 A1 | 4/2010 | Park et al. |
| 2010/0097353 A1 | 4/2010 | Newton |
| 2010/0125438 A1 | 5/2010 | Audet |
| 2010/0127975 A1 | 5/2010 | Jensen |
| 2010/0134435 A1 | 6/2010 | Kimura et al. |
| 2010/0142823 A1 | 6/2010 | Wang et al. |
| 2010/0187422 A1 | 7/2010 | Kothari et al. |
| 2010/0193259 A1 | 8/2010 | Wassvik |
| 2010/0229091 A1 | 9/2010 | Homma et al. |
| 2010/0238139 A1 | 9/2010 | Goertz et al. |
| 2010/0245292 A1 | 9/2010 | Wu |
| 2010/0265170 A1 | 10/2010 | Norieda |
| 2010/0277436 A1 | 11/2010 | Feng et al. |
| 2010/0283785 A1 | 11/2010 | Satulovsky |
| 2010/0284596 A1 | 11/2010 | Miao et al. |
| 2010/0289754 A1 | 11/2010 | Sleeman et al. |
| 2010/0295821 A1 | 11/2010 | Chang et al. |
| 2010/0302196 A1 | 12/2010 | Han et al. |
| 2010/0302209 A1 | 12/2010 | Large |
| 2010/0302210 A1 | 12/2010 | Han et al. |
| 2010/0302240 A1 | 12/2010 | Lettvin |
| 2010/0315379 A1 | 12/2010 | Allard et al. |
| 2010/0321328 A1 | 12/2010 | Chang et al. |
| 2010/0322550 A1 | 12/2010 | Trott |
| 2011/0043490 A1 | 2/2011 | Powell et al. |
| 2011/0049388 A1 | 3/2011 | Delaney et al. |
| 2011/0050649 A1 | 3/2011 | Newton et al. |
| 2011/0051394 A1 | 3/2011 | Bailey |
| 2011/0068256 A1 | 3/2011 | Hong et al. |
| 2011/0069039 A1 | 3/2011 | Lee et al. |
| 2011/0069807 A1 | 3/2011 | Dennerlein et al. |
| 2011/0074725 A1 | 3/2011 | Westerman et al. |
| 2011/0074734 A1 | 3/2011 | Wassvik et al. |
| 2011/0074735 A1 | 3/2011 | Wassvik et al. |
| 2011/0084939 A1 | 4/2011 | Gepner et al. |
| 2011/0090176 A1 | 4/2011 | Christiansson et al. |
| 2011/0102374 A1 | 5/2011 | Wassvik et al. |
| 2011/0115748 A1 | 5/2011 | Xu |
| 2011/0121323 A1 | 5/2011 | Wu et al. |
| 2011/0122075 A1 | 5/2011 | Seo et al. |
| 2011/0122091 A1 | 5/2011 | King et al. |
| 2011/0122094 A1 | 5/2011 | Tsang et al. |
| 2011/0134079 A1 | 6/2011 | Stark |
| 2011/0147569 A1 | 6/2011 | Drumm |
| 2011/0157095 A1 | 6/2011 | Drumm |
| 2011/0157096 A1 | 6/2011 | Drumm |
| 2011/0163996 A1 | 7/2011 | Wassvik et al. |
| 2011/0163997 A1 | 7/2011 | Kim |
| 2011/0163998 A1 | 7/2011 | Goertz et al. |
| 2011/0169780 A1 | 7/2011 | Goertz et al. |
| 2011/0175852 A1 | 7/2011 | Goertz et al. |
| 2011/0205186 A1 | 8/2011 | Newton et al. |
| 2011/0216042 A1* | 9/2011 | Wassvik ............... G06F 3/0412 345/175 |
| 2011/0221705 A1 | 9/2011 | Yi et al. |
| 2011/0221997 A1 | 9/2011 | Kim et al. |
| 2011/0227036 A1 | 9/2011 | Vaufrey |
| 2011/0227874 A1 | 9/2011 | Fåhraeus et al. |
| 2011/0234537 A1 | 9/2011 | Kim et al. |
| 2011/0254864 A1 | 10/2011 | Tsuchikawa et al. |
| 2011/0261020 A1 | 10/2011 | Song et al. |
| 2011/0267296 A1 | 11/2011 | Noguchi et al. |
| 2011/0291989 A1 | 12/2011 | Lee |
| 2011/0298743 A1 | 12/2011 | Machida et al. |
| 2011/0309325 A1 | 12/2011 | Park et al. |
| 2011/0310045 A1 | 12/2011 | Toda et al. |
| 2012/0019448 A1 | 1/2012 | Pitkanen et al. |
| 2012/0026408 A1 | 2/2012 | Lee et al. |
| 2012/0038593 A1 | 2/2012 | Rönkä et al. |
| 2012/0062474 A1 | 3/2012 | Weishaupt et al. |
| 2012/0068973 A1 | 3/2012 | Christiansson et al. |
| 2012/0086673 A1 | 4/2012 | Chien et al. |
| 2012/0089348 A1 | 4/2012 | Perlin et al. |
| 2012/0110447 A1 | 5/2012 | Chen |
| 2012/0131490 A1 | 5/2012 | Lin et al. |
| 2012/0141001 A1 | 6/2012 | Zhang et al. |
| 2012/0146930 A1 | 6/2012 | Lee |
| 2012/0153134 A1 | 6/2012 | Bergström et al. |
| 2012/0154338 A1 | 6/2012 | Bergström et al. |
| 2012/0162142 A1 | 6/2012 | Christiansson et al. |
| 2012/0162144 A1 | 6/2012 | Fåhraeus et al. |
| 2012/0169672 A1 | 7/2012 | Christiansson |
| 2012/0181419 A1 | 7/2012 | Momtahan |
| 2012/0182266 A1 | 7/2012 | Han |
| 2012/0188206 A1 | 7/2012 | Sparf et al. |
| 2012/0191993 A1 | 7/2012 | Drader et al. |
| 2012/0200532 A1 | 8/2012 | Powell et al. |
| 2012/0200538 A1 | 8/2012 | Christiansson et al. |

(56) References Cited

U.S. PATENT DOCUMENTS

| | | |
|---|---|---|
| 2012/0212441 A1 | 8/2012 | Christiansson et al. |
| 2012/0217882 A1 | 8/2012 | Wong et al. |
| 2012/0218229 A1 | 8/2012 | Drumm |
| 2012/0249478 A1 | 10/2012 | Chang et al. |
| 2012/0256882 A1 | 10/2012 | Christiansson et al. |
| 2012/0268403 A1 | 10/2012 | Christiansson |
| 2012/0268427 A1 | 10/2012 | Slobodin |
| 2012/0274559 A1 | 11/2012 | Mathai et al. |
| 2012/0305755 A1 | 12/2012 | Hong et al. |
| 2012/0313865 A1 | 12/2012 | Pearce |
| 2013/0021300 A1 | 1/2013 | Wassvik |
| 2013/0021302 A1 | 1/2013 | Drumm |
| 2013/0027404 A1 | 1/2013 | Sarnoff |
| 2013/0044073 A1 | 2/2013 | Christiansson et al. |
| 2013/0055080 A1 | 2/2013 | Komer et al. |
| 2013/0076697 A1 | 3/2013 | Goertz et al. |
| 2013/0082980 A1 | 4/2013 | Gruhlke et al. |
| 2013/0106709 A1 | 5/2013 | Simmons |
| 2013/0107569 A1 | 5/2013 | Suganuma |
| 2013/0113715 A1 | 5/2013 | Grant et al. |
| 2013/0120320 A1 | 5/2013 | Liu et al. |
| 2013/0125016 A1 | 5/2013 | Pallakoff et al. |
| 2013/0127790 A1 | 5/2013 | Wassvik |
| 2013/0135258 A1 | 5/2013 | King et al. |
| 2013/0135259 A1 | 5/2013 | King et al. |
| 2013/0141388 A1 | 6/2013 | Ludwig et al. |
| 2013/0141395 A1 | 6/2013 | Holmgren et al. |
| 2013/0154983 A1 | 6/2013 | Christiansson et al. |
| 2013/0155027 A1 | 6/2013 | Holmgren et al. |
| 2013/0158504 A1 | 6/2013 | Ruchti et al. |
| 2013/0181896 A1 | 7/2013 | Gruhlke et al. |
| 2013/0181953 A1 | 7/2013 | Hinckley et al. |
| 2013/0187891 A1 | 7/2013 | Eriksson et al. |
| 2013/0201142 A1 | 8/2013 | Suarez Rovere |
| 2013/0222346 A1 | 8/2013 | Chen et al. |
| 2013/0241887 A1 | 9/2013 | Sharma |
| 2013/0249833 A1 | 9/2013 | Christiansson et al. |
| 2013/0269867 A1 | 10/2013 | Trott |
| 2013/0275082 A1 | 10/2013 | Follmer et al. |
| 2013/0285920 A1 | 10/2013 | Colley |
| 2013/0285968 A1 | 10/2013 | Christiansson et al. |
| 2013/0300716 A1 | 11/2013 | Craven-Bartle et al. |
| 2013/0307795 A1 | 11/2013 | Suarez Rovere |
| 2013/0342490 A1 | 12/2013 | Wallander et al. |
| 2014/0002400 A1 | 1/2014 | Christiansson et al. |
| 2014/0028575 A1 | 1/2014 | Parivar et al. |
| 2014/0028604 A1 | 1/2014 | Morinaga et al. |
| 2014/0028629 A1 | 1/2014 | Drumm et al. |
| 2014/0036203 A1 | 2/2014 | Guillou et al. |
| 2014/0055421 A1 | 2/2014 | Christiansson et al. |
| 2014/0063853 A1 | 3/2014 | Nichol et al. |
| 2014/0071653 A1 | 3/2014 | Thompson et al. |
| 2014/0085241 A1 | 3/2014 | Christiansson et al. |
| 2014/0092052 A1 | 4/2014 | Grunthaner et al. |
| 2014/0098032 A1 | 4/2014 | Ng et al. |
| 2014/0098058 A1 | 4/2014 | Baharav et al. |
| 2014/0109219 A1 | 4/2014 | Rohrweck et al. |
| 2014/0125633 A1 | 5/2014 | Fåhraeus et al. |
| 2014/0139467 A1 | 5/2014 | Ghosh et al. |
| 2014/0160762 A1 | 6/2014 | Dudik et al. |
| 2014/0192023 A1 | 7/2014 | Hoffman |
| 2014/0232669 A1 | 8/2014 | Ohlsson et al. |
| 2014/0237401 A1 | 8/2014 | Krus et al. |
| 2014/0237408 A1 | 8/2014 | Ohlsson et al. |
| 2014/0237422 A1 | 8/2014 | Ohlsson et al. |
| 2014/0253520 A1 | 9/2014 | Cueto et al. |
| 2014/0253831 A1 | 9/2014 | Craven-Bartle |
| 2014/0259029 A1 | 9/2014 | Choi et al. |
| 2014/0267124 A1 | 9/2014 | Christiansson et al. |
| 2014/0292701 A1 | 10/2014 | Christiansson et al. |
| 2014/0300572 A1 | 10/2014 | Ohlsson et al. |
| 2014/0320460 A1 | 10/2014 | Johansson et al. |
| 2014/0347325 A1 | 11/2014 | Wallander et al. |
| 2014/0362046 A1 | 12/2014 | Yoshida |
| 2014/0368471 A1 | 12/2014 | Christiansson et al. |
| 2014/0375607 A1 | 12/2014 | Christiansson et al. |
| 2015/0002386 A1 | 1/2015 | Mankowski et al. |
| 2015/0009687 A1 | 1/2015 | Lin |
| 2015/0015497 A1 | 1/2015 | Leigh |
| 2015/0035774 A1 | 2/2015 | Christiansson et al. |
| 2015/0035803 A1 | 2/2015 | Wassvik et al. |
| 2015/0053850 A1 | 2/2015 | Uvnäs |
| 2015/0054759 A1 | 2/2015 | Christiansson et al. |
| 2015/0083891 A1 | 3/2015 | Wallander |
| 2015/0103013 A9 | 4/2015 | Huang |
| 2015/0121691 A1 | 5/2015 | Wang |
| 2015/0130769 A1 | 5/2015 | Björklund |
| 2015/0138105 A1 | 5/2015 | Christiansson et al. |
| 2015/0138158 A1 | 5/2015 | Wallander et al. |
| 2015/0138161 A1 | 5/2015 | Wassvik |
| 2015/0205441 A1 | 7/2015 | Bergström et al. |
| 2015/0215450 A1 | 7/2015 | Seo et al. |
| 2015/0242055 A1 | 8/2015 | Wallander |
| 2015/0271481 A1 | 9/2015 | Guthrie et al. |
| 2015/0286698 A1 | 10/2015 | Gagnier et al. |
| 2015/0317036 A1 | 11/2015 | Johansson et al. |
| 2015/0324028 A1 | 11/2015 | Wassvik et al. |
| 2015/0331544 A1 | 11/2015 | Bergström et al. |
| 2015/0331545 A1 | 11/2015 | Wassvik et al. |
| 2015/0331546 A1 | 11/2015 | Craven-Bartle et al. |
| 2015/0331547 A1 | 11/2015 | Wassvik et al. |
| 2015/0332655 A1 | 11/2015 | Krus et al. |
| 2015/0346856 A1 | 12/2015 | Wassvik |
| 2015/0346911 A1 | 12/2015 | Christiansson |
| 2015/0363042 A1 | 12/2015 | Krus et al. |
| 2016/0004898 A1 | 1/2016 | Holz |
| 2016/0026337 A1 | 1/2016 | Wassvik et al. |
| 2016/0034099 A1 | 2/2016 | Christiansson et al. |
| 2016/0050746 A1 | 2/2016 | Wassvik et al. |
| 2016/0070415 A1 | 3/2016 | Christiansson et al. |
| 2016/0070416 A1 | 3/2016 | Wassvik |
| 2016/0117019 A1 | 4/2016 | Michiaki |
| 2016/0124546 A1 | 5/2016 | Chen et al. |
| 2016/0124551 A1 | 5/2016 | Christiansson et al. |
| 2016/0077616 A1 | 6/2016 | Durojaiye et al. |
| 2016/0154531 A1 | 6/2016 | Wall |
| 2016/0154532 A1 | 6/2016 | Campbell |
| 2016/0202841 A1 | 7/2016 | Christiansson et al. |
| 2016/0216844 A1 | 7/2016 | Bergström |
| 2016/0224144 A1 | 8/2016 | Klinghult et al. |
| 2016/0299583 A1 | 10/2016 | Watanabe |
| 2016/0299593 A1 | 10/2016 | Christiansson et al. |
| 2016/0328090 A1* | 11/2016 | Klinghult ............... G06F 3/0428 |
| 2016/0328091 A1* | 11/2016 | Wassvik .................. G06F 3/042 |
| 2016/0334942 A1* | 11/2016 | Wassvik .................. G06F 3/042 |
| 2016/0342282 A1 | 11/2016 | Wassvik |
| 2016/0357348 A1 | 12/2016 | Wallander |
| 2017/0010688 A1 | 1/2017 | Fahraeus et al. |
| 2017/0090090 A1 | 3/2017 | Craven-Bartle et al. |
| 2017/0102827 A1 | 4/2017 | Christiansson et al. |
| 2017/0115235 A1 | 4/2017 | Ohlsson et al. |
| 2017/0115823 A1 | 4/2017 | Huang et al. |
| 2017/0139541 A1 | 5/2017 | Christiansson et al. |
| 2017/0177163 A1 | 6/2017 | Wallander et al. |
| 2017/0185230 A1 | 6/2017 | Wallander et al. |
| 2017/0293392 A1 | 10/2017 | Christiansson et al. |
| 2017/0344185 A1 | 11/2017 | Ohlsson et al. |
| 2018/0031753 A1 | 2/2018 | Craven-Bartle et al. |
| 2018/0129354 A1 | 5/2018 | Christiansson et al. |
| 2018/0210572 A1 | 7/2018 | Wallander et al. |
| 2018/0225006 A1 | 8/2018 | Wall |
| 2018/0253187 A1 | 9/2018 | Christiansson et al. |
| 2018/0267672 A1 | 9/2018 | Wassvik et al. |
| 2018/0275788 A1 | 9/2018 | Christiansson et al. |
| 2018/0275830 A1 | 9/2018 | Christiansson et al. |
| 2018/0275831 A1 | 9/2018 | Christiansson et al. |
| 2019/0050074 A1 | 2/2019 | Kocovski |

FOREIGN PATENT DOCUMENTS

| | | |
|---|---|---|
| CN | 101644854 A | 2/2010 |
| CN | 201437963 U | 4/2010 |
| CN | 201 465 071 U | 5/2010 |
| CN | 101019071 B | 6/2012 |

(56) References Cited

FOREIGN PATENT DOCUMENTS

| | | |
|---|---|---|
| CN | 101206550 B | 6/2012 |
| CN | 203 189 466 U | 9/2013 |
| CN | 203 224 848 U | 10/2013 |
| CN | 101075168 B | 4/2014 |
| CN | 205 015 574 U | 2/2016 |
| DE | 3511330 C2 | 5/1988 |
| DE | 68902419 T2 | 3/1993 |
| DE | 69000920 T2 | 6/1993 |
| DE | 19809934 A1 | 9/1999 |
| DE | 10026201 A1 | 12/2000 |
| DE | 102010000473 A1 | 8/2010 |
| EP | 0845812 B1 | 6/1998 |
| EP | 0600576 B1 | 10/1998 |
| EP | 0931731 A1 | 7/1999 |
| EP | 1798630 A2 | 6/2007 |
| EP | 0897161 B1 | 10/2007 |
| EP | 2088501 A1 | 8/2009 |
| EP | 1512989 B1 | 9/2009 |
| EP | 2077490 A3 | 1/2010 |
| EP | 1126236 B1 | 12/2010 |
| EP | 2314203 A1 | 4/2011 |
| EP | 2339437 A3 | 10/2011 |
| EP | 2442180 A1 | 4/2012 |
| EP | 2466429 A1 | 6/2012 |
| EP | 2479642 A1 | 7/2012 |
| EP | 1457870 B1 | 8/2012 |
| EP | 2565770 A2 | 3/2013 |
| EP | 2778849 A1 | 9/2014 |
| EP | 2515216 A1 | 3/2016 |
| FR | 2172828 A1 | 10/1973 |
| FR | 2617619 B1 | 1/1990 |
| FR | 2614711 B1 | 3/1992 |
| FR | 2617620 B1 | 9/1992 |
| FR | 2676275 A1 | 11/1992 |
| GB | 1380144 A | 1/1975 |
| GB | 2131544 B | 3/1986 |
| GB | 2204126 A | 11/1988 |
| JP | 2000506655 A | 5/2000 |
| JP | 2000172438 A | 6/2000 |
| JP | 2000259334 A | 9/2000 |
| JP | 2000293311 A | 10/2000 |
| JP | 2003330603 A | 11/2003 |
| JP | 2005004278 A | 1/2005 |
| JP | 2008506173 A | 2/2008 |
| JP | 2011530124 A | 12/2011 |
| KR | 100359400 | 7/2001 |
| KR | 100940435 | 2/2010 |
| WO | WO 1984/003186 A1 | 8/1984 |
| WO | WO 1999/046602 A1 | 9/1999 |
| WO | WO 01/127867 A1 | 4/2001 |
| WO | WO 01/84251 A2 | 11/2001 |
| WO | WO 02/35460 A1 | 5/2002 |
| WO | WO 02/077915 A2 | 10/2002 |
| WO | WO 02/095668 A1 | 11/2002 |
| WO | WO 03/076870 A1 | 9/2003 |
| WO | WO 2004/032210 A2 | 4/2004 |
| WO | WO 2004/081502 A2 | 9/2004 |
| WO | WO 2004/081956 A2 | 9/2004 |
| WO | WO 2005/026938 A2 | 3/2005 |
| WO | WO 2005/029172 A2 | 3/2005 |
| WO | WO 2005/029395 A2 | 3/2005 |
| WO | WO 2005/125011 A1 | 12/2005 |
| WO | WO 2006/095320 A2 | 9/2006 |
| WO | WO 2006/124551 A2 | 11/2006 |
| WO | WO 2007/003196 A2 | 1/2007 |
| WO | WO 2007/058924 A2 | 5/2007 |
| WO | WO 2007/112742 A1 | 10/2007 |
| WO | WO 2008/004103 A2 | 1/2008 |
| WO | WO 2008/007276 A2 | 1/2008 |
| WO | WO 2008/017077 A2 | 2/2008 |
| WO | WO 2008/034184 A1 | 3/2008 |
| WO | WO 2008/039006 A1 | 4/2008 |
| WO | WO 2008/068607 A2 | 6/2008 |
| WO | WO 2006/124551 B1 | 7/2008 |
| WO | WO 2008/017077 A4 | 2/2009 |
| WO | WO 2009/048365 A1 | 4/2009 |
| WO | WO 2009/077962 A2 | 6/2009 |
| WO | WO 2009/102681 A2 | 8/2009 |
| WO | WO 2009/137355 A2 | 11/2009 |
| WO | WO 2010/006882 A2 | 1/2010 |
| WO | WO 2010/006883 A2 | 1/2010 |
| WO | WO 2010/006884 A2 | 1/2010 |
| WO | WO 2010/006885 A2 | 1/2010 |
| WO | WO 2010/006886 A2 | 1/2010 |
| WO | WO 2010/015408 A1 | 2/2010 |
| WO | WO 2010/046539 A1 | 4/2010 |
| WO | WO 2010/056177 A1 | 5/2010 |
| WO | WO 2010/064983 A2 | 6/2010 |
| WO | WO 2010/081702 A2 | 7/2010 |
| WO | WO 2010/112404 A1 | 10/2010 |
| WO | WO 2010/123809 A2 | 10/2010 |
| WO | WO 2010/134865 A1 | 11/2010 |
| WO | WO 2011/028169 A1 | 3/2011 |
| WO | WO 2011/028170 A1 | 3/2011 |
| WO | WO 2011/049511 A1 | 4/2011 |
| WO | WO 2011/049512 A1 | 4/2011 |
| WO | WO 2011/049513 A1 | 4/2011 |
| WO | WO 2011/057572 A1 | 5/2011 |
| WO | WO 2011/078769 A1 | 6/2011 |
| WO | WO 2011/082477 A1 | 7/2011 |
| WO | WO 2011/139213 A1 | 11/2011 |
| WO | WO 2012/002894 A1 | 1/2012 |
| WO | WO 2012/010078 A1 | 1/2012 |
| WO | WO 2012/018176 A2 | 2/2012 |
| WO | WO 2012/050510 A1 | 4/2012 |
| WO | WO 2012/082055 A1 | 6/2012 |
| WO | WO 2012/105893 A1 | 8/2012 |
| WO | WO 2012/121652 A1 | 9/2012 |
| WO | WO 2012/158105 A2 | 11/2012 |
| WO | WO 2012/172302 A1 | 12/2012 |
| WO | WO 2012/176801 A1 | 12/2012 |
| WO | WO 2013/036192 A1 | 3/2013 |
| WO | WO 2013/048312 A2 | 4/2013 |
| WO | WO 2013/055282 A2 | 4/2013 |
| WO | WO 2013/062471 A2 | 5/2013 |
| WO | WO 2013/089622 A2 | 6/2013 |
| WO | WO 2013/115710 A2 | 8/2013 |
| WO | WO 2013/133756 A1 | 9/2013 |
| WO | WO 2013/133757 A2 | 9/2013 |
| WO | WO 2013/176613 A2 | 11/2013 |
| WO | WO 2013/176614 A2 | 11/2013 |
| WO | WO 2013/176615 A2 | 11/2013 |
| WO | WO 2014/055809 A1 | 4/2014 |
| WO | WO 2014/086084 A1 | 6/2014 |
| WO | WO 2014/098744 A1 | 6/2014 |
| WO | WO 2014/104967 A1 | 7/2014 |
| WO | WO 2015/175586 A1 | 11/2015 |
| WO | WO 2018/106172 A1 | 6/2018 |

OTHER PUBLICATIONS

Ahn, Y., et al., "A slim and wide multi-touch tabletop interface and its applications," BigComp2014, IEEE, 2014, in 6 pages.

Chou, N., et al., "Generalized pseudo-polar Fourier grids and applications in regfersting optical coherence tomography images," 43rd Asilomar Conference on Signals, Systems and Computers, Nov. 2009, in 5 pages.

Fihn, M., "Touch Panel—Special Edition," Veritas et Visus, Nov. 2011, in 1 page.

Fourmont, K., "Non-Equispaced Fast Fourier Transforms with Applications to Tomography," Journal of Fourier Analysis and Applications, vol. 9, Issue 5, 2003, in 20 pages.

Iizuka, K., "Boundaries, Near-Field Optics, and Near-Field Imaging," Elements of Photonics, vol. 1: In Free Space and Special Media, Wiley & Sons, 2002, in 57 pages.

International Search Report for International App. No. PCT/SE2017/050102, dated Apr. 5, 2017, in 4 pages.

Johnson, M., "Enhanced Optical Touch Input Panel", IBM Technical Disclosure Bulletin, 1985, in 3 pages.

Kak, et al., "Principles of Computerized Tomographic Imaging", Institute of Electrical Engineers, Inc., 1999, in 333 pages.

(56) References Cited

OTHER PUBLICATIONS

Liu, J., et al. "Multiple touch points identifying method, involves starting touch screen, driving specific emission tube, and computing and transmitting coordinate of touch points to computer system by direct lines through interface of touch screen," 2007, in 25 pages.
Natterer, F., "The Mathematics of Computerized Tomography", Society for Industrial and Applied Mathematics, 2001, in 240 pages.
Natterer, F., et al. "Fourier Reconstruction," Mathematical Methods in Image Reconstruction, Society for Industrial and Applied Mathematics, 2001, in 12 pages.
Paradiso, J.A., "Several Sensor Approaches that Retrofit Large Surfaces for Interactivity," ACM Ubicomp 2002 Workshop on Collaboration with Interactive Walls and Tables, 2002, in 8 pages.
Tedaldi, M., et al. "Refractive index mapping of layered samples using optical coherence refractometry," Proceedings of SPIE, vol. 7171, 2009, in 8 pages.
Supplementary European Search Report for European App. No. EP 16759213, dated Oct. 4, 2018, in 9 pages.
Extended European Search Report for European App. No. 16743795.3, dated Sep. 11, 2018, in 5 pages.
International Search Report for International App. No. PCT/SE2017/051224, dated Feb. 23, 2018, in 5 pages.
Extended European Search Report in European Application No. 19165019.1, dated Jul. 18, 2019 in 8 pages.
International Preliminary Report on Patentability received in International Application No. PCT/SE2017/051233, dated Jun. 11, 2019, in 6 pages.
International Search Report for International App. No. PCT/SE2018/050070, dated Apr. 25, 2018, in 4 pages.
Extended European Search Report in European Application No. 17750516.1, dated Jul. 16, 2019 in 5 pages.

\* cited by examiner

AUTOMATIC OPTIMISATION OF TOUCH SIGNAL

TECHNICAL FIELD

The present invention relates to a method and apparatus for reducing the effects of ambient light noise resulting from incident ambient light on an optical touch system.

BACKGROUND ART

Touch sensing systems ("touch systems") are in widespread use in a variety of applications. Typically, the touch sensing systems are actuated by a touch object such as a finger or stylus, either in direct contact, or through proximity (i.e. without contact), with a touch surface. Touch sensing systems are for example used as touch pads of laptop computers, in control panels, and as overlays to displays on e.g. hand held devices, such as mobile telephones and interactive whiteboards. A touch panel that is overlaid on or integrated in a display is also denoted a "touch screen". Many other applications are known in the art.

WO2010/064983 discloses a multi-touch system, which is based on frustrated total internal reflection (FTIR). Light sheets are coupled into a panel to propagate inside the panel by total internal reflection (TIR). When an object comes into contact with a touch surface of the panel, the propagating light will be attenuated at the point of touch. Arrays of light sensors are located around the perimeter of the touch surface to detect the received light for each light sheet and generate a signal value for each light path across the touch surface. The signal values of the light sensors are normalized by respective reference values and input into an image reconstruction algorithm that generates a two-dimensional distribution of attenuation values across the touch surface. This enables repeated determination of current position/size/shape of touches while one or more users interact with the touch surface. In FTIR systems, the touches need to be detected against a background of interferences, e.g. originating from fingerprints and other types of smear on the touch surface. The influence of interferences may vary not only over time but also across the touch surface, making it difficult to properly detect the touches on the touch surface at all times. WO2011/028169 proposes manipulating the reference values to compensate for the influence of contaminations in the attenuation pattern, and WO2011/049512 proposes tracking a two-dimensional background pattern of the contamination contribution and using the background pattern to generate an attenuation pattern that is compensated for contaminations.

Optical touch systems often need to be designed with a high sensitivity, since a touching object may result in only a small attenuation of the propagating light, e.g. less than 1%. Certain systems may therefore be designed to detect attenuations on the order of 0.1%-0.01%. To ensure proper touch detection, WO2011/078769 proposes monitoring the temporal variability of the signal values to identify potential causes for reduced performance of the touch system, e.g. due to component failure, and implementing corrective measures to account for unreliable signal values.

WO2013/115710 describes processing the output signal of an optical touch system to generate a set of data samples comprises ON energy values when the light signal is being transmitted and OFF energy value when no light signal is being transmitted. An estimated ambient value is determined from the OFF energy value. An ambient-compensated energy value is generated by subtracting an estimated ambient value from the ON energy value for each actual detection line. However, this technique only provides significant improvements for light noise sources that are unmodulated (e.g. Sunlight) or modulated with a low frequency (e.g. Incandescent lamps). This technique provides poor results with respect to modulated noise sources like fluorescent lighting.

Therefore, what is needed is a way of improving performance of an optical touch system in an environment that comprises various types of ambient light noise.

SUMMARY

It is an objective of the invention to at least partly overcome one or more limitations of the prior art.

A first embodiment of the invention describes a method of operating an optical touch apparatus, the optical touch apparatus comprising: a panel (10), a plurality of emitters (30a, 31a, 32a) and a plurality of detectors (30b, 31b, 32b) arranged with respect to the panel, the plurality of detectors configured to receive light from the plurality of emitters thereby defining detection samples (D) of light transmitted between pairs of emitters and detectors, a controller coupled to the plurality of emitters to generate the signals and wherein each detector is configured to generate an output signal, the optical touch apparatus being configured to operate in a data sampling mode operating in a sequence of repetitions, each repetition comprising the steps of: turning the emitters ON and OFF according to a timing configuration during each repetition such that the output signal for each detector is generated to comprise ON energy values for the detection samples (D) and at least one OFF energy value, processing the output signals to generate a set of data samples, each data sample being generated to represent detected energy for one of the detection samples (D), and processing the set of data samples to detect an interaction with the panel, the optical touch apparatus being further configured to operate in an ambient light evaluation mode comprising the steps of: generating a first set of samples over a first integration time and a second set of samples over a second integration time using at least one detector, and applying a filter to at least the first and second set of samples to generate a residual ambient light value indicative of ambient light noise, wherein the method comprises the steps of: operating the optical touch apparatus according to the ambient light evaluation mode for a plurality of repetitions, wherein the length of at least one of the first integration time and second integration time vary between repetitions, selecting the first integration time and/or second integration time that generated an optimal residual ambient light value, and operating the optical touch apparatus in the data sampling mode with a timing configuration corresponding to the selected first integration time and/or second integration time. The filter may be configured to generate a residual ambient light value indicative of ambient light in dependence on the difference between the second set of samples and the first set of samples. The optimal residual ambient light value may correspond to the residual ambient light value having the lowest magnitude. The first integration time may be the same length as the second integration time. A first settling period may occur between the first integration time and the second integration time.

The ambient light evaluation mode may further comprising the steps of: generating a first set of samples over a first integration time, a second set of samples over a second integration time, and a third set of samples over a third integration time using at least one detector (30b'), and applying an ambient light filter to the first, second, and third set of samples to generate a residual ambient light value indicative of ambient light noise, wherein the touch apparatus is configured to operate in the data sampling mode with a timing configuration corresponding to the first, second, and third integration time of the determined the ambient light evaluation mode repetition. The first integration time may be the same length as the third integration time. A second settling period may occur between the second integration time and the third integration time. The second integration time may correspond to the integration time of the ON signal, the first integration time corresponds to integration time of the OFF signal preceding the ON signal, and the third integration time corresponds to integration time of the OFF signal following the ON signal. The ambient light filter may be configured to generate a residual ambient light value indicative of ambient light in dependence on the difference between a signal sampled over the second integration time and an average of the signal sampled over the first integration time and the signal sampled over the third integration time. The ambient light filter may be configured to generate a residual ambient light value indicative of ambient light in dependence on the difference between a signal sampled over the second integration time and a linear interpolation of the signal sampled over the first integration time and the signal sampled over the third integration time. The steps of the ambient light evaluation mode may be performed once per frame, more than once per frame, or less often than every frame. The ambient light evaluation mode steps may be performed at the beginning, middle or end of every frame. The residual ambient light value may be determined for a plurality of the detectors of the touch apparatus and wherein the optimal residual ambient light value is determined as a function of the plurality of residual ambient light values. The function may be an average or maximum of the residual ambient light values. A total of number of different configurations of the first, second, and third integration times may be greater than 2 and wherein the apparatus being configured to cycle through the total of number of configurations in subsequent ambient light evaluation mode repetitions. Preferably, between 1 and 10 configurations of the total number of configurations may be tested each frame. Preferably, the first second or third integration time may have a length of between 3 µs to 30 µs. Preferably, the first second or third integration times are changed in steps of between 0.1 µs and 20 µs each ambient light evaluation mode repetition. The optimal residual ambient light value may also be selected as a function of the first and second integration times as well as the residual ambient light value. The residual ambient light value exceeding a performance threshold value and having the shortest first and second integration times may be selected as the optimal residual ambient light value. The system may be configured to not alter the first, second and third integration times used by the optical touch apparatus whilst operating in the data sampling mode whilst a touch interaction with the touch system is occurring.

A second embodiment of the invention describes An optical touch apparatus (100) comprising: a panel (10), a plurality of emitters (30a, 31a, 32a) and a plurality of detectors (30b, 31b, 32b) arranged with respect to the panel, the plurality of detectors configured to receive light from the plurality of emitters thereby defining detection samples (D) of light transmitted between pairs of emitters and detectors, a controller coupled to the plurality of emitters to generate the signals and wherein each detector is configured to generate an output signal, the optical touch apparatus being configured to operate in a data sampling mode operating in a sequence of repetitions, each repetition comprising the steps of: turning the emitters ON and OFF according to a timing configuration during each repetition such that the output signal for each detector is generated to comprise ON energy values for the detection samples (D) and at least one OFF energy value, processing the output signals to generate a set of data samples, each data sample being generated to represent detected energy for one of the detection samples (D), and processing the set of data samples to detect an interaction with the panel, the optical touch apparatus being further configured to operate in an ambient light evaluation mode comprising the steps of: generating a first set of samples over a first integration time and a second set of samples over a second integration time using at least one detector, and applying a filter to at least the first and second set of samples to generate a residual ambient light value indicative of ambient light noise, wherein the touch apparatus is configured to perform the following steps: operating according to the ambient light evaluation mode for a plurality of repetitions, wherein the length of at least one of the first integration time and second integration time vary between repetitions, selecting the first integration time and/or second integration time that generated an optimal residual ambient light value, and operating the touch apparatus in the data sampling mode with a timing configuration corresponding to the selected first integration time and/or second integration time.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

DETAILED DESCRIPTION OF EXAMPLE EMBODIMENTS

Figure 1:
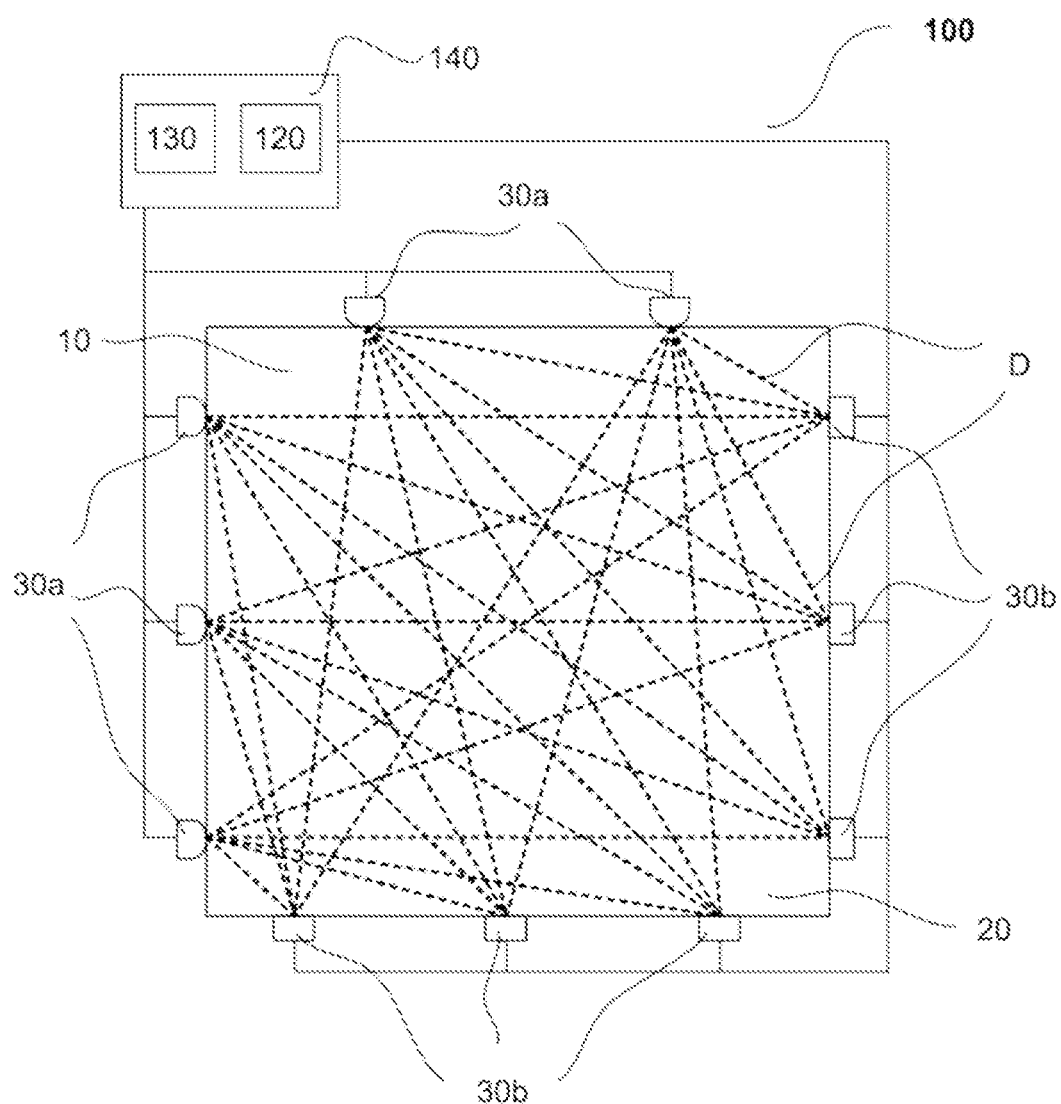
FIG. 1 is a top plan view of a touch sensing apparatus with light beams.

Below follows a description of example embodiments of a technique for enabling extraction of touch data for objects in contact with a touch surface of a touch-sensitive apparatus. Throughout the following description, the same reference numerals are used to identify corresponding elements.

Terms

Before describing embodiments of the invention, a few definitions will be given.

A "touch object" or "touching object" is a physical object that touches, or is brought in sufficient proximity to, a touch surface so as to be detected by one or more sensors in the touch system. The physical object may be animate or inanimate.

An "interaction" occurs when the touch object affects a parameter measured by the sensor.

An "interaction strength" is a relative or absolute measure of the degree of interaction. The "interaction strength" may be represented as an "attenuation".

An "interaction map" or "interaction pattern" is a two-dimensional (2D) distribution of interaction strength across the touch surface, or a portion thereof. If the interaction is presented as attenuation, the interaction map/pattern is also denoted an "attenuation map" or "attenuation pattern".

A "touch" denotes a point of interaction as seen in the interaction pattern.

A "frame" or "iteration" denotes a repeated event comprising an ambient light evaluation, data collection, and determination of touch data.

As used herein, a "trace" is information about the temporal history of an interaction. Touches from an interaction detected in a sequence of frames, i.e. at different points in time, are collected into a trace.

Figure 2:
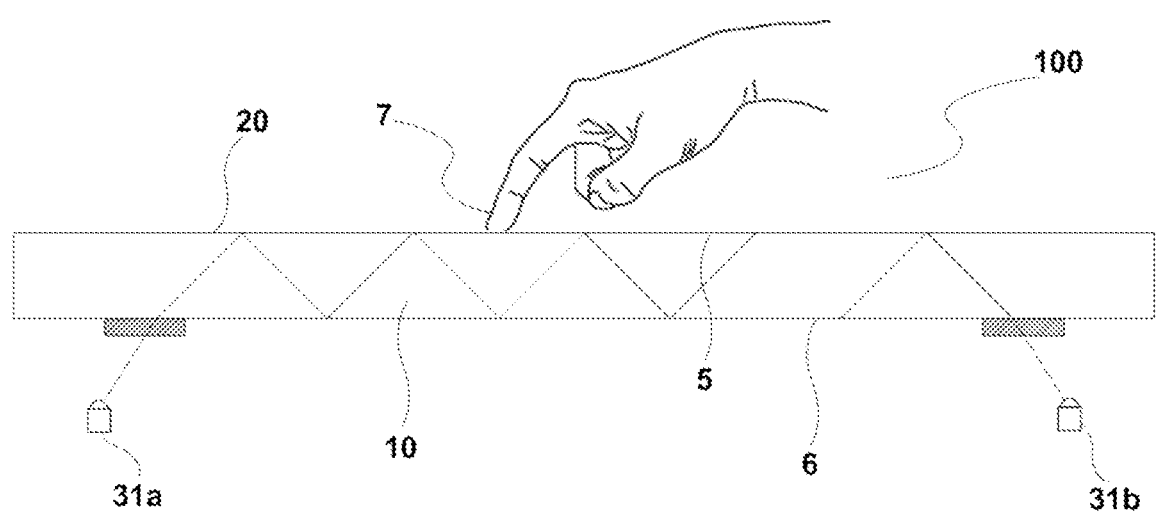
FIG. 2 is a side view of the apparatus in FIG. 1 in which light propagates from emitters to detectors by total internal reflection through a glass panel.
Figure 3:
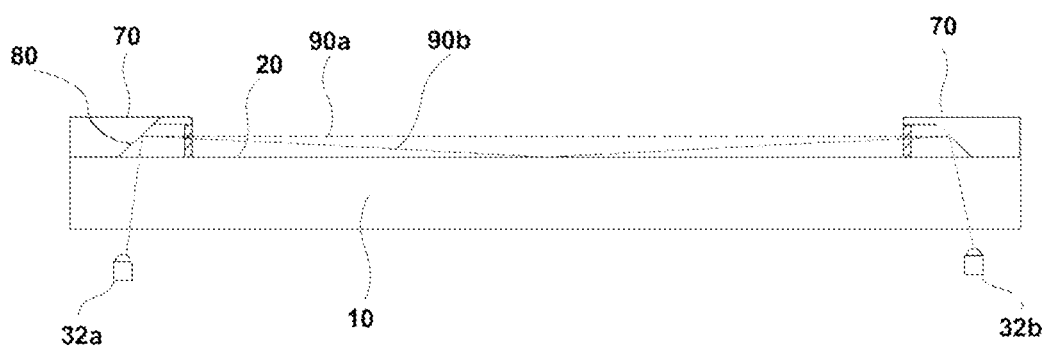
FIG. 3 is a side view of the apparatus in FIG. 1 in which light travels from emitters to detectors along a path largely above a glass panel.

Embodiments of the inventions relate to signal processing in relation to a touch-sensitive apparatus which is based on the concept of transmitting energy of some form across a touch surface, such that an object that is brought into close vicinity of, or in contact with, the touch surface causes a local decrease in the transmitted energy. The apparatus may be configured to permit transmission of energy in one of many different forms. The emitted signals may be any radiation or wave energy that can travel in and/or across the touch surface including, without limitation, light waves in the visible or infrared or ultraviolet spectral regions. Example embodiments of the invention will be described in relation to a touch-sensitive apparatus 100, which is shown in FIGS. 1-3 and is based on the concept of transmitting the light through a glass panel via TIR (Total Internal Reflection) or transmission of the light above the touch surface. The apparatus 100 operates by transmitting light across a panel 10, from light emitters 30a, 31a, 32a to light sensors or detectors 30b, 31b, 32b. In the embodiment shown in FIG. 2, the transmitted light illuminates a touch surface 20 from within the panel 10. The panel 10 is made of solid material in one or more layers and may have any shape. The panel 10 defines an internal radiation propagation channel, in which light propagates by internal reflections. The propagation channel is defined between the boundary surfaces 5, 6 of the panel 10, where the top surface 5 allows the propagating light to interact with touching objects 7 and thereby defines the touch surface 20. This is achieved by injecting the light into the panel 10 such that the light is reflected by total internal reflection (TIR) in the touch surface 20 as it propagates through the panel 10. The light may be reflected by TIR in the bottom surface 6 or against a reflective coating thereon. It is also conceivable that the propagation channel is spaced from the bottom surface 6, e.g. if the panel comprises multiple layers of different materials. The apparatus 100 may be designed to be overlaid on or integrated into a display device or monitor.

The apparatus 100 allows an object 7 that is brought in contact with the touch surface 20 to interact with the propagating light at the point of touch. In this interaction, part of the light may be scattered by the object 7, part of the light may be absorbed by the object 7, and part of the light may continue to propagate in its original direction across the panel 10. Thus, the touching object 7 causes a local frustration of the total internal reflection, which leads to a decrease in the energy (or, equivalently, power or intensity) of the transmitted light.

In the embodiment shown in FIG. 3, light is passed above the surface of the panel instead of within the panel. Such a configuration of an optical touch system may be described as an 'above surface' optical touch system. In this configuration, the apparatus 100 allows an object 7 that is brought in contact with the touch surface 20 to interact with the light travelling above the surface of the panel at the point of touch on the panel. In this interaction, a portion of the light travelling above the surface of the panel will be interrupted by the object, which leads to a decrease in the energy (or, equivalently, power or intensity) of the transmitted light received at detectors downstream of the touching objects 7.

The emitters 30a, 31a, 32a are distributed along the perimeter of the touch surface 20 to generate a corresponding number of light sheets inside or above the panel 10. In the example of FIG. 2, each emitter 31a generates a beam of light that expands in the plane of the panel 10 while propagating in the panel 10. Each beam propagates from one or more entry or incoupling points on the panel 10. The detectors 31b are distributed along the perimeter of the touch surface 20 to receive the light from the emitters 31a at a number of spaced-apart outcoupling points on the panel 10. It should be understood that the incoupling and outcoupling points merely refer to the position where the beam enters and leaves, respectively, the panel 10. Thus, although not shown in FIG. 2, one emitter/detector may be optically coupled to a number of incoupling/outcoupling points.

While various configurations for an above surface system exist, FIG. 3 describes an embodiment in which a portion of the light emitted by emitters 32a is transmitted through transmissive panel 100. The light exits transmissive panel 100 through touch surface 20 and is reflected by reflector surface 80 of edge reflector 70 to travel along paths 90a and 90b in a plane parallel with touch surface 20. The light will then continue until deflected by reflector surface 80 of the edge reflector 70 at an opposing edge of the transmissive panel 100, wherein the light will be deflected back down through transmissive panel 100 and onto detectors 32*b*. In another embodiment, the emitters and detectors may be positioned to emit and receive light directly above the surface of the panel. Alternatively, the light from emitters positioned below the panel may be directed around the edge of the panel by means of a light guide or other optical arrangement. A corresponding arrangement may convey the light from above the surface of the panel to the detectors positioned beneath the panel.

The detectors 30*b*, 31*b*, 32*b* collectively provide an output signal, which is received and sampled by a signal processor 130. The output signal contains a number of sub-signals, also denoted "projection signals", each representing the energy of light emitted by a certain light emitter and received by a certain detector. Depending on implementation, the signal processor 130 may need to process the output signal for separation of the individual projection signals. Conceptually, the touch apparatus 100 is considered to define a grid of detection lines D on the touch surface 20, where each detection line D corresponds to a light propagation path from an emitter to a detector, as projected onto the touch surface 20. Thus, the projection signals represent the received energy or power of light on the individual detection lines D. It is realised that the touching object 7 results in a decrease (attenuation) of the received energy on one or more detection lines D.

As will be explained below, the signal processor 130 may be configured to process the projection signals so as to determine a distribution of attenuation values (for simplicity, referred to as an "attenuation pattern") across the touch surface 20, where each attenuation value represents a local attenuation of light. The attenuation pattern may be represented in many different ways, e.g. as attenuation values arranged in a regular x-y-grid, such as in an ordinary digital image, although other types of grids are conceivable, e.g. hexagonal patterns or triangular meshes. The attenuation pattern may be further processed by the signal processor 130 or by a separate device (not shown) for touch determination, which may involve extraction of touch data, such as a position (e.g. x,y coordinates), a shape or an area of each touching object. In the following, a "frame" denotes a repeated event starting with ambient light evaluation and data collection and ending with determination of touch data.

The signal processor 130 may be configured to process the projection signals so as to determine a property of the touching objects, such as a position (e.g. in an x,y coordinate system), a shape, or an area. This determination may involve a straight-forward triangulation based on the attenuated detection lines, e.g. as disclosed in U.S. Pat. No. 7,432,893 and WO2010/015408, or a more advanced processing to recreate a distribution of attenuation values (for simplicity, referred to as an "attenuation pattern") across the touch surface 20, where each attenuation value represents a local degree of light attenuation. The attenuation pattern may be further processed by the signal processor 130 or by a separate device (not shown) for determination of a position, shape or area of touching objects. The attenuation pattern may be generated e.g. by any available algorithm for image reconstruction based on projection signal values, including tomographic reconstruction methods such as Filtered Back Projection, FFT-based algorithms, ART (Algebraic Reconstruction Technique), SART (Simultaneous Algebraic Reconstruction Technique), etc. Alternatively, the attenuation pattern may be generated by adapting one or more basis functions and/or by statistical methods such as Bayesian inversion. Examples of such reconstruction functions designed for use in touch determination are found in WO2009/077962, WO2011/049511, WO2011/139213, WO2012/050510, and WO2013/062471.

In the illustrated example, the apparatus 100 also includes a controller 120 (also called a which is connected to selectively control the activation of the emitters 30*a*, 31*a*, 32*a* and, possibly, the readout of data from the detectors 30*b*, 31*b*, 32*b*. The signal processor 130 and the controller 120 may be configured as separate units, or they may be incorporated in a single unit. One or both of the signal processor 130 and the controller 120 may be at least partially implemented by software executed by a processing unit 140.

In one embodiment, the different emitters 30*a*, 31*a*, 32*a* are activated in sequence within a frame, such that each individual emitter is activated separately, whereby the transmitted light energy can be measured at each detector that receives light from the activated emitter. Thereby, an energy value is measured for each detection line during the frame.

In an alternative embodiment, groups of emitters 30*a*, 31*a*, 32*a* are activated concurrently, wherein each emitter is controlled to transmit a code by way of the emitted light such that the code identifies the respective emitter. Based on the transmitted codes, the energy measured by each detector in the light detection arrangement can be separated into energy values for each detection line. Such an emitter activation scheme is denoted "multiplexing" and is further described in PCT publication WO2010/064983.

Embodiments of the invention utilise the energy values measured by the detectors 30*b*, 31*b*, 32*b* while the emitters 30*a*, 31*a*, 32*a* are OFF and ON. In the following, an "ON value" denotes detected energy when a signal is conducted from the emitter to the detector, and an "OFF value" denotes detected energy without a signal being conducted.

The OFF values are conventionally used for so-called ambient compensation, which aims at removing or at least suppressing signal components originating from ambient light and detector dark level, including any analog-to-digital conversion (ADC) offset. Ambient light refers to light that is received by a detector while not originating from the emitters. The ON/OFF activation scheme of the emitters may enable each detector to measure an OFF value one or several times during a frame. As described in WO2013115710A2, an ambient-compensated energy value each for detection line may then be obtained. The ON value or an average of ON values is recorded for each detection line, i.e. the energy measured by the detector associated with detection line when the emitter associated with detection line is ON, and OFF value or an average of OFF values, i.e. the energy measured by the detector associated with detection line is recorded when all emitters are OFF. The OFF values, obtained during one or plural frames, are processed to generate a current estimate of the noise level for each individual detector, and hence for each detection line. The ambient-compensated energy value of each detection line is then determined to be the difference between the ON value and OFF value. By using the ambient measurements for validation, all influence from touching objects on the estimated noise level is avoided. Furthermore, the validation process may be designed to operate on the same data as the ambient compensation. In one embodiment, the noise estimate is continuously updated using the latest OFF values. In another embodiment, the noise estimate is given by an exponential forget estimation of the variance (standard deviation) of the OFF values.

It was realised that the above technique was insufficient to handle ambient noise having a variety of different power spectra. Although unmodulated or modulated light at low frequencies may be adequately addressed by the above technique, light modulated at a frequency higher than the frequency at which the emitters are turned ON and OFF is effectively unfiltered and may cause significant detrimental effects to performance of the touch system. Therefore, the following text describes a dynamic ambient light filter configured to respond to the characteristics of ambient light sources and filter to the ambient light source in an optimal way, taking into account restraints including touch accuracy, frame rate, and power usage.

Figure 4A:
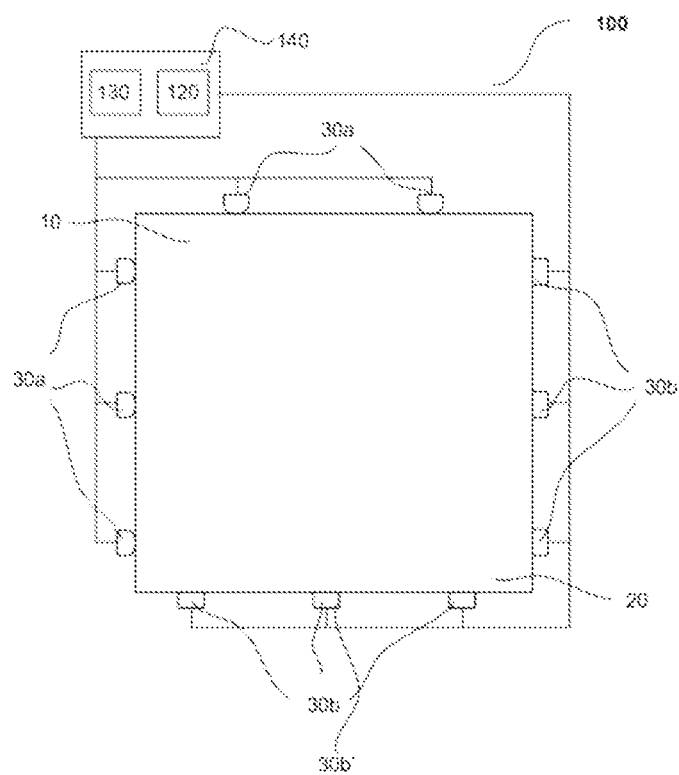
FIGS. 4a to 4e show a portion of the scan scheme sequence.
Figure 4B:
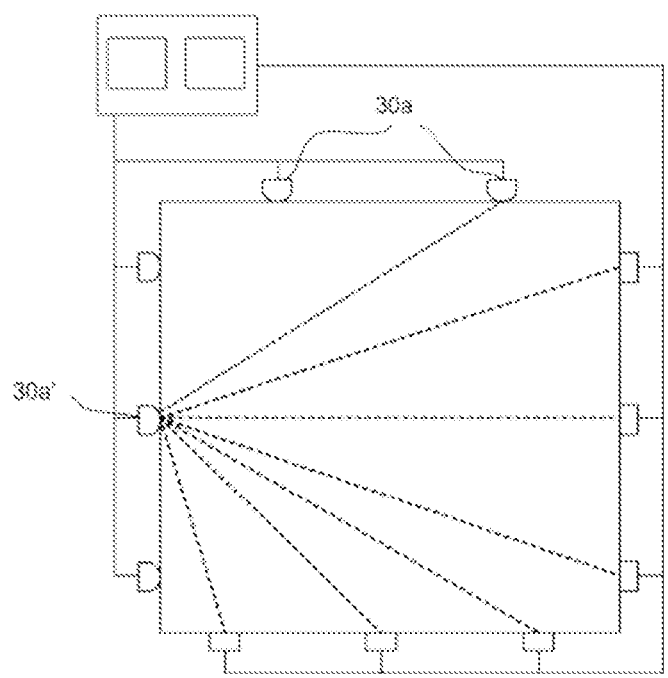
Figure 4C:
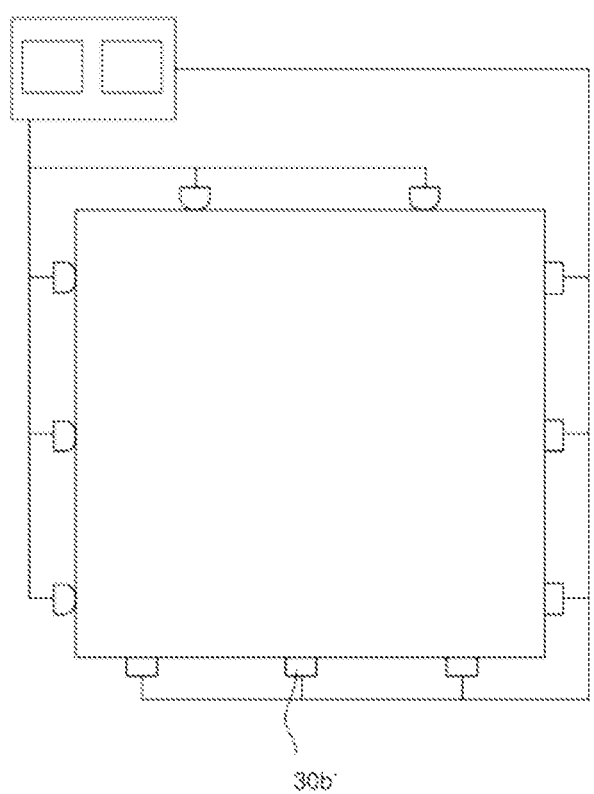
Figure 4D:
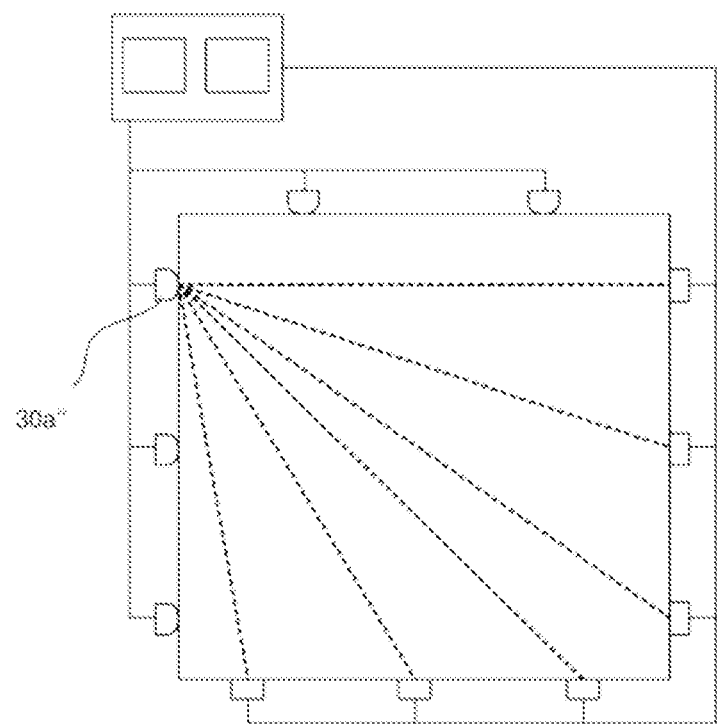
Figure 4E:
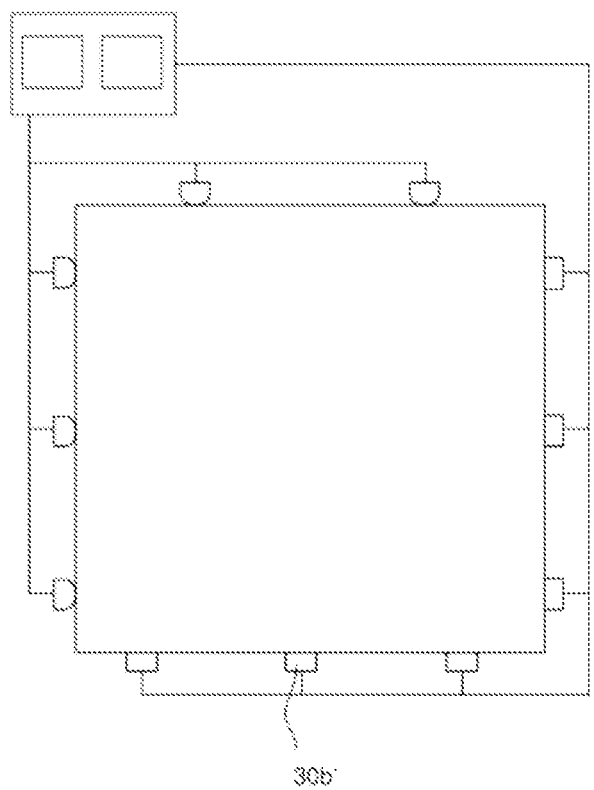
Figure 5:
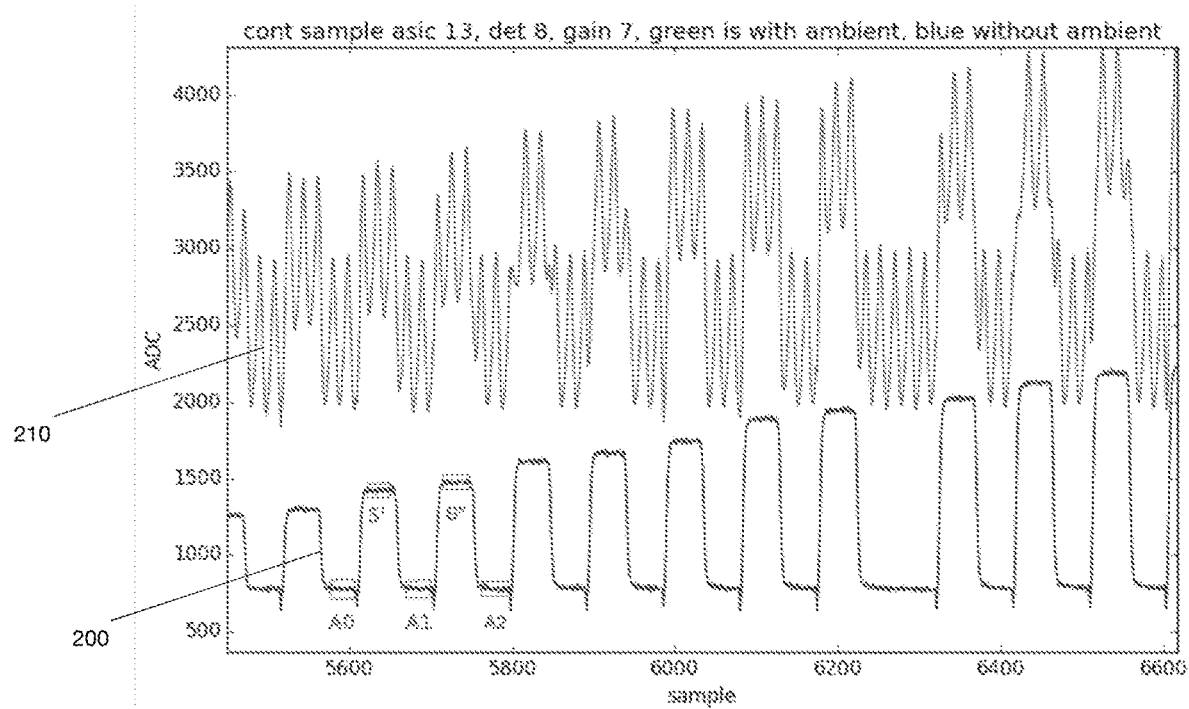
FIG. 5 shows a signal detected at a single detector. An uncompensated signal with ambient disturbances and an uncompensated signal without ambient disturbances is shown.

FIGS. 4a-4e and FIG. 5 provide an example of the measurement of OFF and ON samples. FIGS. 4a-4e show a portion of a scan scheme sequence in which a sequence of emitters are used to transmit a signal with rest periods in between. FIG. 5 shows an uncompensated signal 210 with ambient disturbances and uncompensated signal 200 without ambient disturbances. FIG. 5 shows a received signal at detector 30b' over a portion of the scan scheme sequence. In FIG. 4a, no signal is being transmitted by any emitter for a first period of time. FIG. 5 shows a corresponding received signal at detector 30b' over the first period of time marked A0. In FIG. 4b, emitter 30a' emits a signal for a second period of time. FIG. 5 shows a corresponding received signal at detector 30b' over the second period of time marked S'. In FIG. 4c, no signal is being transmitted by any emitter for a third period of time. FIG. 5 shows a corresponding received signal at detector 30b' over the third period of time marked A1. In FIG. 4d, emitter 30a" emits a signal for a fourth period of time. FIG. 5 shows a corresponding received signal at detector 30b' over the fourth period of time marked S". In FIG. 4e, no signal is being transmitted by any emitter for a fifth period of time. FIG. 5 shows a corresponding received signal at detector 30b' over the third period of time marked A2.

Figure 6:
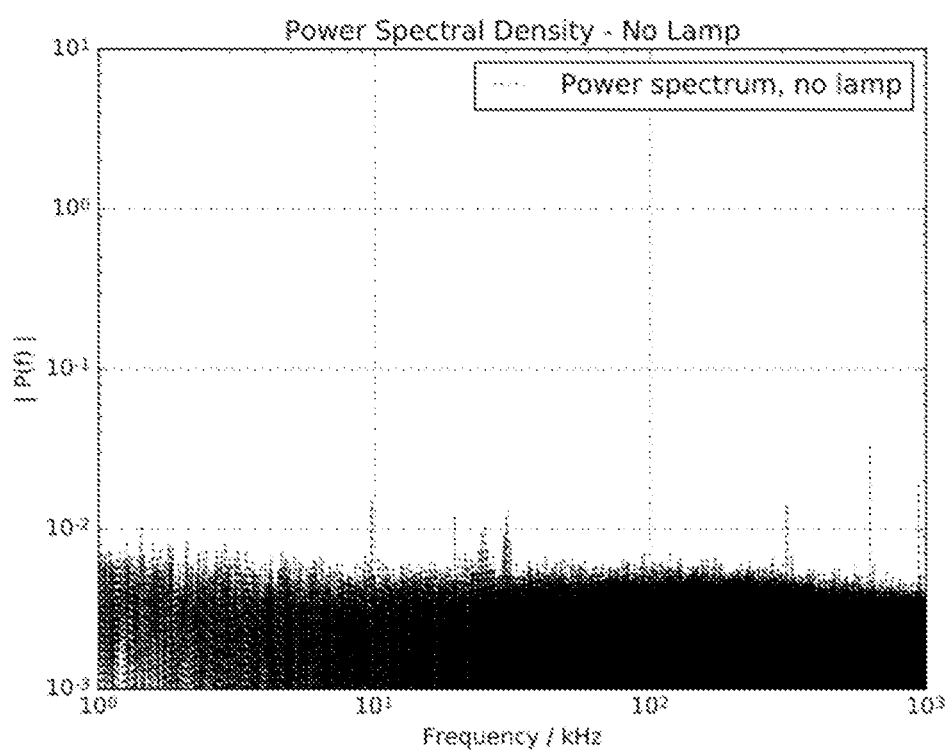
FIG. 6 shows typical power spectrum received by a detector with no ambient electrical light source present.

FIG. 6 shows typical power spectrum received by a detector with no ambient electrical light source present and no emitter turned on.

Figure 16:
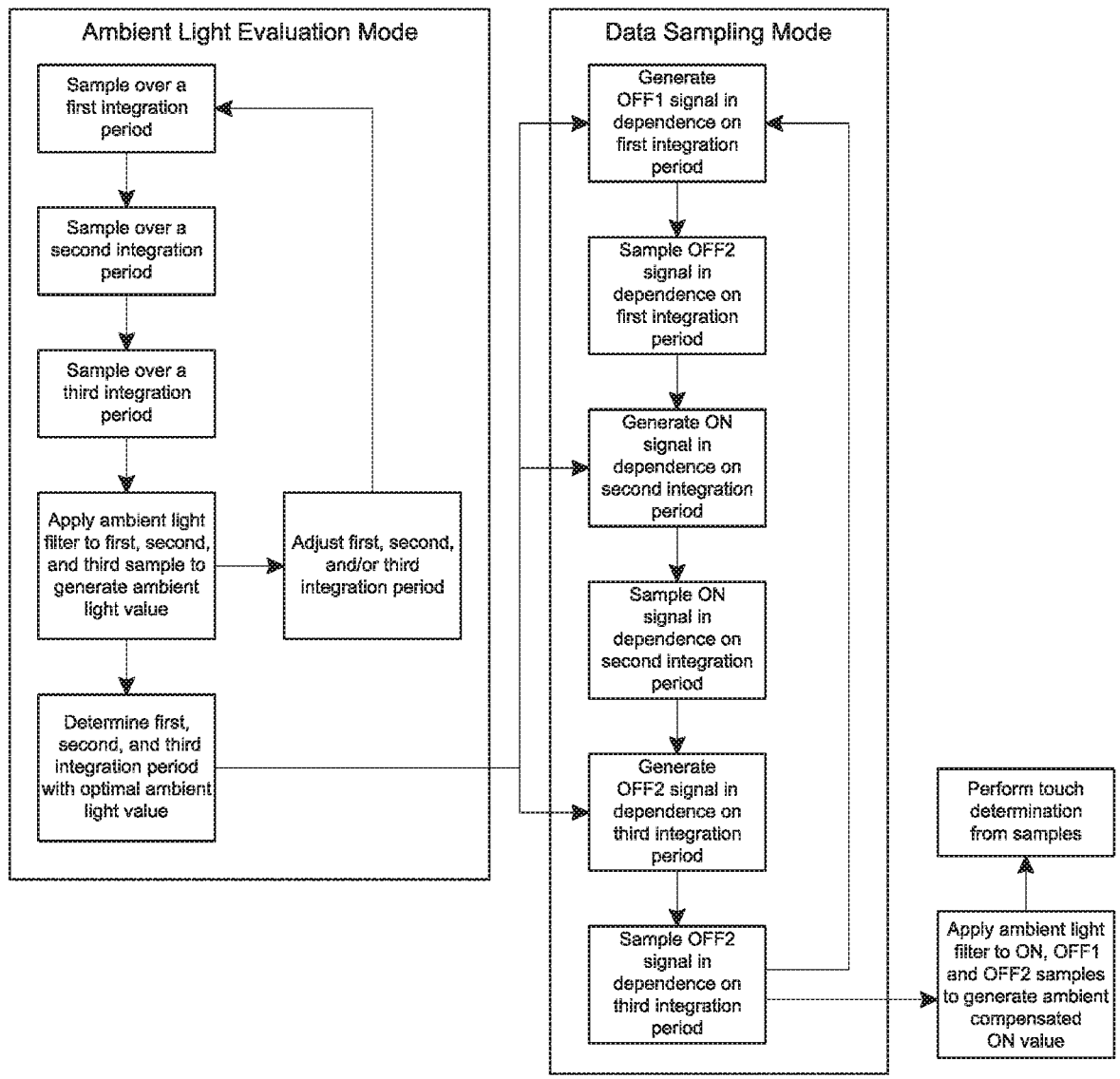
FIG. 16 is a flow chart of an embodiment of the ambient light evaluation mode and data sampling mode.

FIG. 16 shows a flow chart for a system according to an embodiment of the present invention. The flow chart shown in FIG. 16 may describe a sequence of steps performed by the optical touch System of the present invention in each frame. In one embodiment, the steps of the ambient light evaluation mode are performed once per frame. In alternative embodiments, the ambient light evaluation mode steps may be performed more than once per frame or once every number of frames. The ambient light evaluation mode steps may be performed at the beginning, middle or end of every frame. In the following embodiment, the ambient light evaluation mode steps are executed once per frame and at the start of every frame.

According to the embodiment shown in FIG. 16, the optical touch system begins the frame in an ambient light evaluation mode. Whilst in the ambient light evaluation mode, the system executes the following steps:

1—A sample A0 is recorded over a first integration time from a single detector 30b'.

2—A sample S' is recorded over a second integration time, subsequent to the first integration time, from detector 30b'.

3—A sample A1 is recorded over a third integration time, subsequent to the second integration time, from detector 30b'.

4—An ambient light filter function is applied to samples A0, A1 and S' to generate a residual ambient light value.

5—Record the first, second, and third integration time and corresponding residual ambient light value in a memory as a 'filter configuration'.

6—(Repeat at least once) Modify the length of the first, second, and/or third integration time and repeat steps 1-5.

7—Determine the filter configuration in the memory having the optimal residual ambient light value.

8—Operating the optical touch system in a data sampling mode using the first, second, and third integration time of the filter configuration having the optimal residual ambient light value.

The above steps will now be described in detail.

1—A sample A0 is recorded over a first integration time from a single detector 30b'.

The sample A0 may be a single data value recorded from a detector over the first integration time. In this case, the first integration time describes a period of time over which an analogue filtering and/or integration of the received signal is generated. Alternatively, A0 may be a series of data samples.

2—A sample S' is recorded over a second integration time, subsequent to the first integration time, from detector 30b'.

The sample S' may be a single data value recorded from a detector over the second integration time. In this case, the second integration time describes a period of time over which an analogue filtering and/or integration of the received signal is generated. Alternatively, S' may be a series of data samples.

Preferably, a settling time is used between the first integration time and second integration time in order to minimise distortions resulting from the rise and/or fall times of the emitter and detector components between the first integration time and second integration time.

Preferably, the same settling time is used between the second integration time and third integration time as that used between the first integration time and second integration time.

3—A sample A1 is recorded over a third integration time, subsequent to the second integration time, from detector 30b'.

The sample A1 may be a single data value recorded from a detector over the third integration time. In this case, the third integration time describes a period of time over which an analogue filtering and/or integration of the received signal is generated. Alternatively, A1 may be a series of data samples.

In one embodiment, instead of sampling values from a single detector 30b', a plurality or all of the detectors are sampled and an average of the sampled values is used for each of A0, A1, and S'.

4—An ambient light filter function is applied to samples A0, A1 and S' to generate a residual ambient light value.

In a preferred embodiment, the ambient light filter function calculates the residual ambient light value according to the following equation:

A=Average of A0 and A1

S=Average of S'

Residual ambient light value=Magnitude of difference between A and S.

In an embodiment, the ambient light filter function calculates the residual ambient light value according to a linear interpolation of A0 and A1 evaluated at the centre of S'. If S' is a collection of data samples, S' may be digitally integrated and normalised by the number of samples in S' to generate S.

The ambient light filter function may be executed on signal processor 12. Other digital filters as known in the art may be used.

Figure 7:
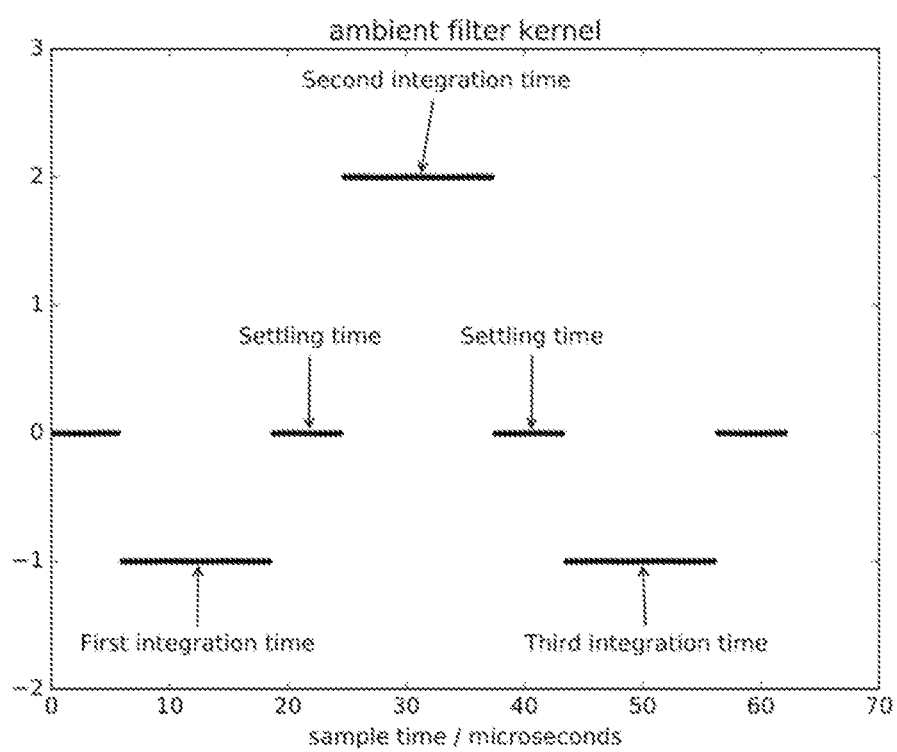
FIG. 7 shows a typical ambient filter kernel.

FIG. 7 shows a typical ambient filter kernel. The ambient filter kernel is applied to the samples recorded at a detector 30b'. Settling times are used in which samples are set to 0 in order to minimise distortions resulting from any signal changes between the first integration time and second integration time. Detector and emitter components typically have a rise and fall time in which output or detection stabilises to a correct value.

Figure 8:
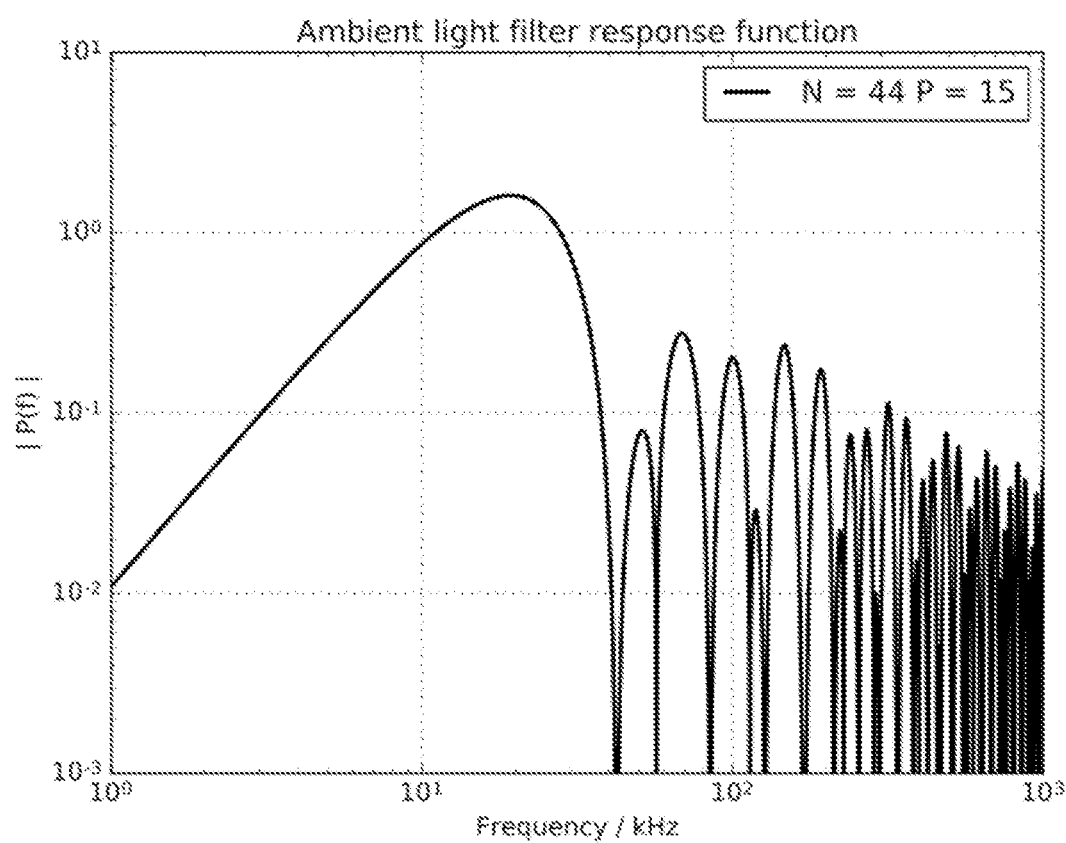
FIG. 8 shows an ambient light filter response function where N=44.

FIG. 8 shows an ambient light filter response function where N=44 and P=15. FIG. 8 is a Fourier transform of the ambient filter kernel shown in FIG. 7, wherein N is the number of digitally accumulated samples used for each of the first, second, and third integration times and P is the number of samples used during the settling times. The ADC in this example is running at 2.5 MHz, i.e. each data sample is 0.4 microseconds long. The left side lobe of FIG. 8 shows that low frequency components are somewhat filtered by filter. At the first singularity, frequencies are not filtered at all. The multiple lobes on the right of the graph at the higher frequencies are a result of the settling times used in between the integration times.

It is clear that from FIG. 8 that shorter integration times (i.e. first, second, and third integration times with fewer samples) can compensate low-frequencies better, i.e. moving the main lobe of FIG. 8 higher up in frequency.

It should be noted that the ambient filter may actually worsen the residual for some frequencies. If the filter response magnitude is 1.0, the ambient filter does not reduce the ambient light impact at all. If it is above 1.0 it will make matters worse. A desired outcome is one with the lowest filter output values possible. It is important that the main and side lobes do not line up with peaks in the power spectral density of high-frequency noise from lamps.

Figure 9:
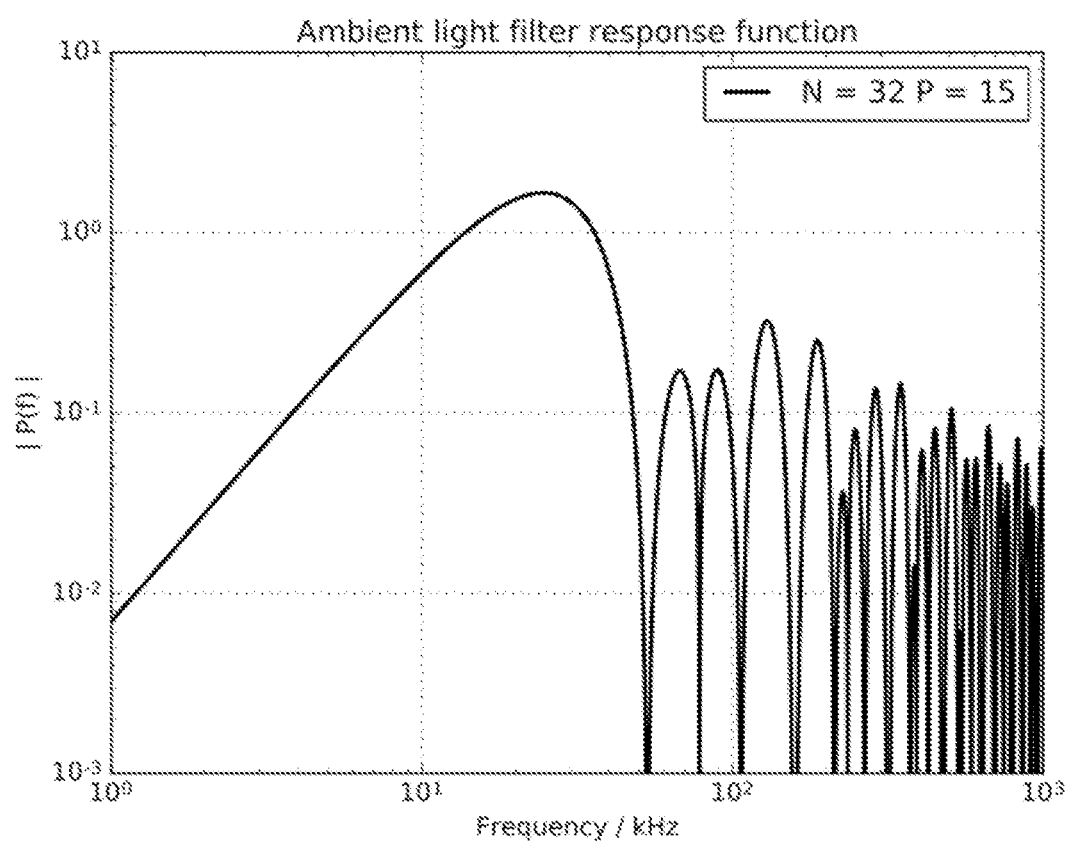
FIG. 9 shows an ambient light filter response function where N=32.

FIG. 9 shows an ambient light filter response function where N=32 and P=15.

Figure 10:
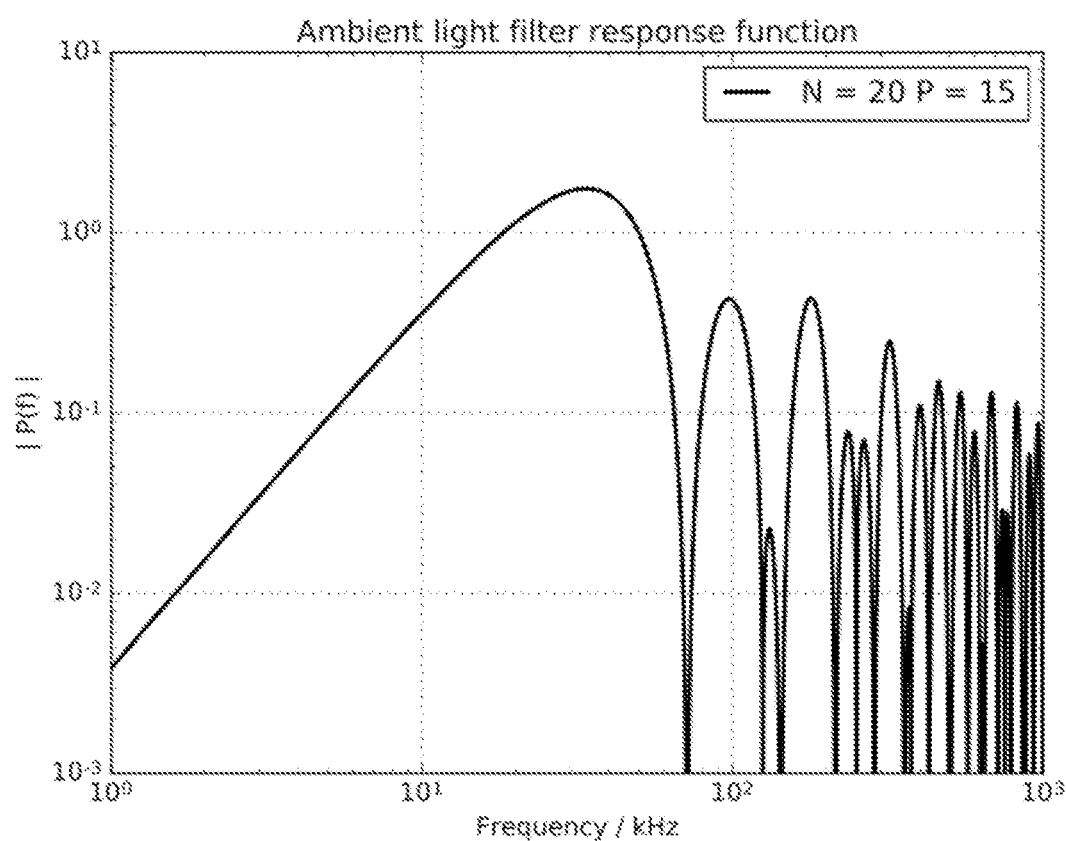
FIG. 10 shows an ambient light filter response function where N=20.

FIG. 10 shows an ambient light filter response function where N=20 and P=15.

5—Record the first, second, and third integration time and corresponding residual ambient light value in a memory as a 'filter configuration'.

The data may be stored in a datastore on signal processor 120. Each filter configuration comprises a first integration time, a second integration time, a third integration time and a residual ambient light value.

In one embodiment, steps 1-3 are repeated a multiple number of times using the same first, second, and third integration times, with the recorded residual ambient light value being the average value of the residual ambient light values calculated each repetition.

6—(Repeat at least once) Modify the length of the first, second, and/or third integration time and repeat steps 1-5.

Preferably, the first integration time, second integration time, and third integration time are all of the same length. Alternatively, both the first and third integration time may be the same length whilst varying in length in proportion to the second integration time. For example, if the first and third integration time are made longer by 5%, the second integration time is made longer by 5% also. However, in some embodiments, the length of the first, second, and third integration times may all be varied independently of each other.

The number of repeats of steps 1-4 may be chosen in dependence on the number of different residual ambient light values that are needed.

In one embodiment, a number of different configurations of the first integration time and second integration time are tested to determine an optimal residual ambient light value. Depending on the number of variables, the number of configurations may be between 5 and 5000. In a preferred embodiment, 3 configurations of 300 possible configurations are tested each frame. This way, all configurations of the first integration time and second integration time may be tested over 100 frames. For an optical touch system operating at 120 frames per second, this allows all 300 configurations to be tested in under a second. Once all 300 configurations have been tested, the system preferably restarts the cycle. This allows the optical touch system to rapidly react to changes in the ambient lighting conditions.

Figure 11:
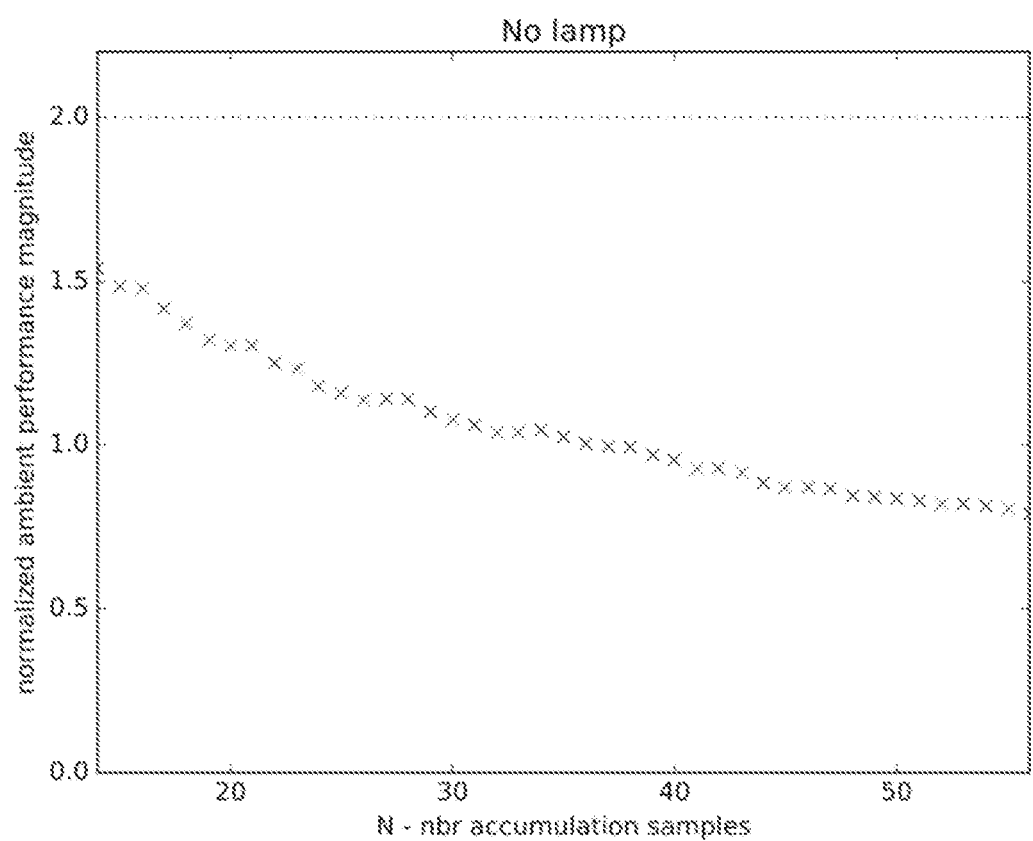
FIG. 11 shows a normalised ambient performance magnitude.

FIG. 11 shows a normalised ambient performance magnitude with no significant ambient light noise. The normalisation is achieved by dividing the value by the integration time to compensate for the fact that the actual signal becomes higher when more samples are accumulated. In FIG. 11, where the number of accumulation samples (n) is 20, the residual ambient light value is 1.3. White noise causes the performance magnitude to curve downwards to the right of the graph.

In one embodiment, the residual ambient light value of each filter configuration may be formed from an averaging of residual ambient light values over a number of cycles. In one example, the residual ambient light values of a particular filter configuration may be calculated as the average of the residual ambient light values of the filter configuration of the previous three cycles. As this average is for samples taken at different times with respect to the ambient noise, the samples are more likely to be recorded at different phases of the modulated ambient noise, reducing the effect and likelihood of aliasing between the high-frequency component of the lamp and the ambient filter kernel. Doing an average over several values make sure that the difference in phase between lamp and filter gets averaged.

In a preferred embodiment where the first integration time and second integration time are the same length, the system is configured to test a second integration time over a range of 6 µs to 30 µs, and incremented in steps of between 0.4 µs and 20 µs.

In one embodiment of the invention, the length of the settling times can be varied in a similar manner to the first, second, and third integration times.

7—Determine the filter configuration in the memory having the optimal residual ambient light value.

In an embodiment, the system is configured to review the filter configurations stored in the datastore to determine an optimal filter configuration. In one embodiment, the optimal filter configuration is determined to be the filter configuration having the residual ambient light value with the lowest magnitude. The lowest magnitude indicates that any modulated ambient light is modulated at a frequency which has less effect on the sampled signal when sampled according to the first and second integration times of the filter configuration.

Figure 12:
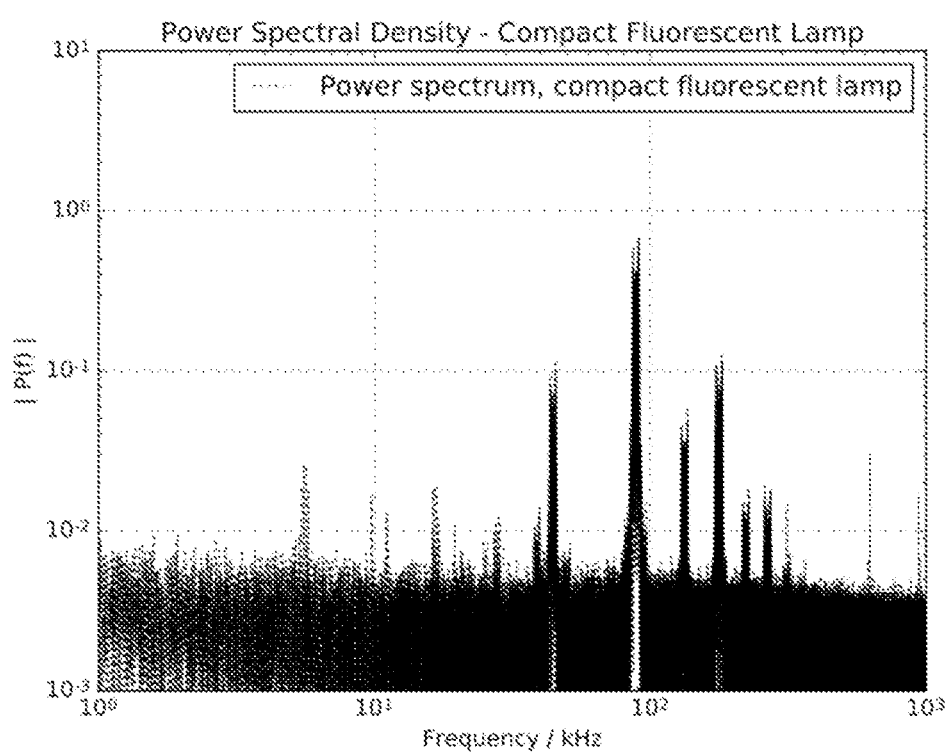
FIG. 12 shows typical power spectrum received by a detector with a compact fluorescent lamp light source present.

FIG. 12 shows typical power spectrum received by a detector with a compact fluorescent lamp light source present. We can see that the lamp has a very strong modulation frequencies around 45 kHz, including overtones at 90, 135, 180, 225, 265 kHz.

Figure 13A:
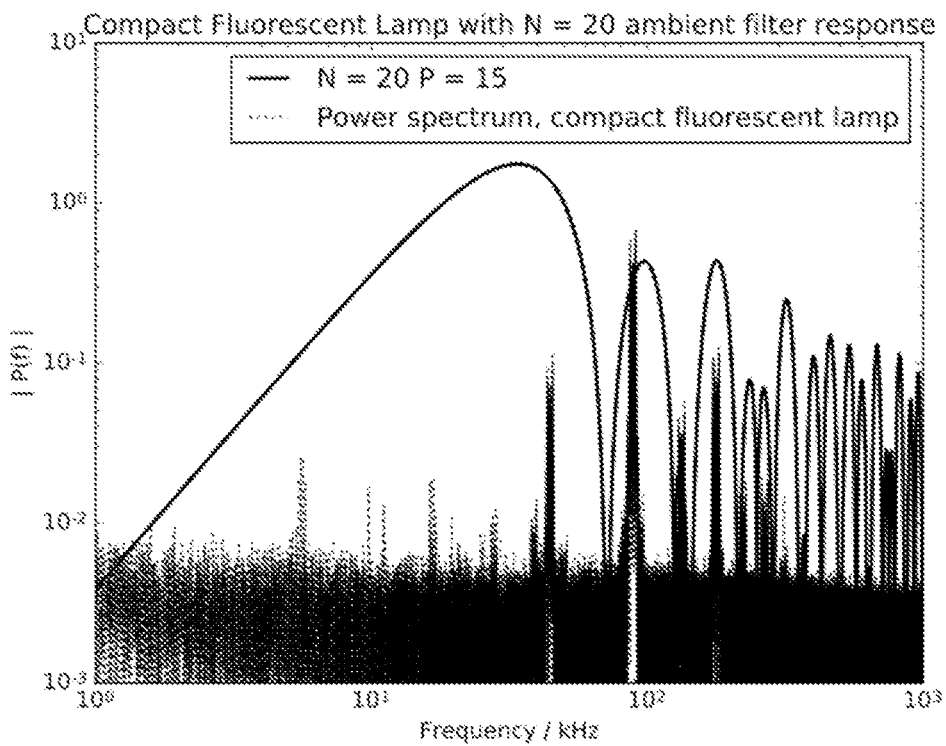
FIG. 13a shows an ambient light filter response function where N=20 with respect to the compact fluorescent lamp light source.

FIG. 13a shows an ambient light filter response function where N=20 with respect to the compact fluorescent lamp light source. We can see that the 45 kHz signal falls within the main lobe and that the first overtone at 90 kHz lines up with one of side lobes. This filter configuration provides a bad response with a substantial amount of the ambient noise remaining unfiltered.

Figure 13B:
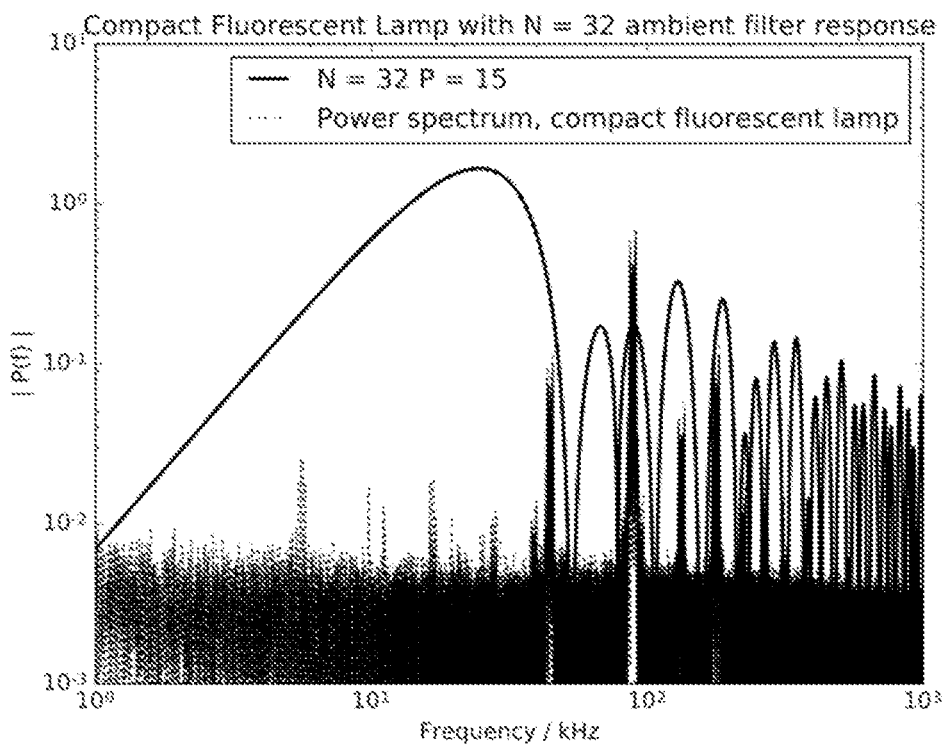
FIG. 13b shows an ambient light filter response function where N=32 with respect to the compact fluorescent lamp light source.

FIG. 13b shows an ambient light filter response function where N=32 with respect to the compact fluorescent lamp light source. This filter configuration provides a similarly bad response the N=20 filter configuration with a substantial amount of the ambient noise remaining unfiltered.

Figure 14:
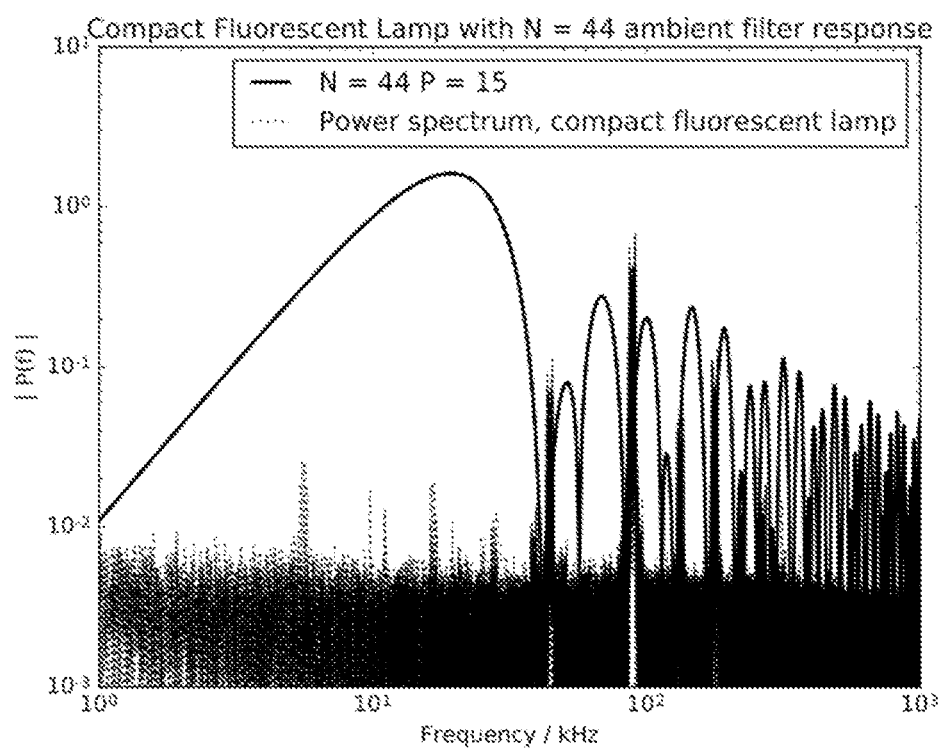
FIG. 14 shows an ambient light filter response function where N=44 with respect to the compact fluorescent lamp light source.

FIG. 14 shows an ambient light filter response function where N=44 with respect to the compact fluorescent lamp light source. In this figure we see that the 45 kHz peak lies between the main lobe and the first side lobe. The 90 kHz peak also lies between two side lobes. This means that the ambient filter is very good at reducing the ambient residual error from this lamp.

Figure 15:
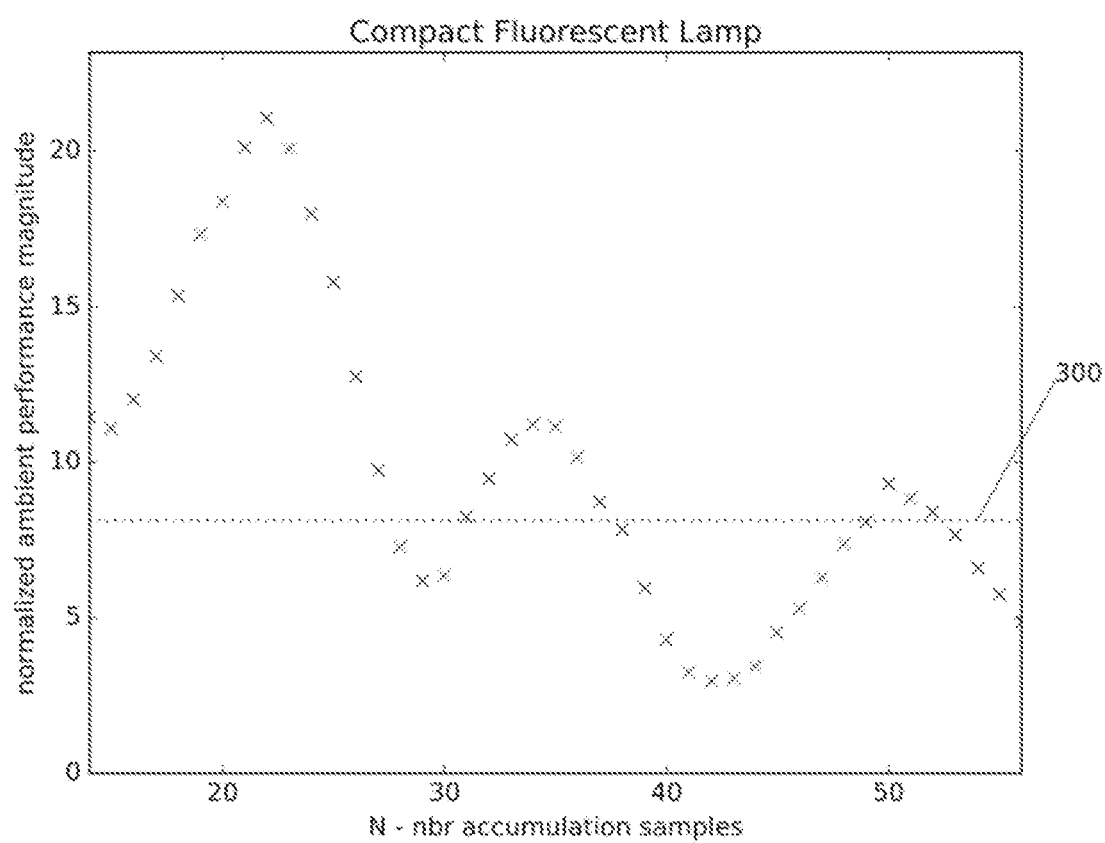
FIG. 15 shows a normalised ambient performance magnitude with a compact fluorescent lamp light source present.

FIG. 15 shows a normalised ambient performance magnitude with a compact fluorescent lamp light source present. For short integration times (N<25) we see that the 45 kHz peak become amplified by the filter since it falls within the region where the frequency response of the filter is greater than 1.0, see new figure. As the integration time increases we see that we have an optimal alignment between power spectral density of the current lamp and ambient filter response when N is around 44.

The optimal filter configuration may also be selected as a function of the first and second integration times as well as the residual ambient light value. In one embodiment shown in FIG. 15, a threshold value 300 exists wherein all filter configurations having a residual ambient light value below the threshold qualify as suitable candidates for usage. i.e. The touch accuracy of the optical touch system when operating according to the first and second integration times of each of the candidates filter configurations is likely to be adequate. In this embodiment, the system may therefore select which filter configuration to use in dependence on characteristics other than the residual ambient light values. Preferably, the filter configuration having the shortest first and second integration times may be selected in order to allow the optical touch system to perform at the fastest frame rate in order to reduce touch latency. Alternatively, whilst the frame rate is maintained at a standard rate (e.g. 150 frames per second), the filter configuration having the shortest first and second integration times may be selected in order to allow the touch system to operate using the lowest power consumption possible. In FIG. 15, the system may select between a value of N at 44 for optimal performance, or N at 29 for shortest sampling periods (for optimal power consumption or shortest frame length).

8—Operating the optical touch system in a data sampling mode using the first, second, and third integration time of the filter configuration having the optimal residual ambient light value.

In the data sampling mode, the system is configured to activate each of the emitters 30a in sequence, whereby the transmitted light energy can be measured at each detector that receives light from the activated emitter. Thereby, an energy value is measured for each detection line during the frame. According to the present embodiment, the system is configured to activate each emitter ON for a period of time corresponding to the second integration time. The period of time for which the emitter is activated ON is typically slightly longer (e.g. 1-20 µs) than the second integration time to allow for rise and/or fall times of the emitter and detector. During the ON period, the system generates an ON sample value at each detector over the second integration time. The system is then configured to ensure that all emitters are OFF for a period of time corresponding to the first/third integration times between ON activations. During the OFF period, the system generates an OFF sample value at each detector over the first integration time. Preferably, a settling time is used between the ON and OFF periods corresponding to the rest period used between the sampling periods of the ambient light evaluation mode. An ambient-compensated energy value of each detection line is then determined to be the difference between the ON sample value and an average of the OFF sample value preceding the ON sample value and the OFF sample value recorded after the ON sample value. Alternatively, ambient-compensated energy value of each detection line may be determined according to a linear interpolation of A0 and A1 evaluated at the centre of S'.

In an alternative embodiment, the system is configured to activate each emitter ON for a period of time corresponding to but shorter than the second integration time. The period of time for which the emitter is activated ON is slightly shorter (e.g. 1-20 µs) than the second integration time to allow for sampling the complete pulse including the rise and/or fall time of the pulse.

In one embodiment, the length of the first, second and third integration times affect the length of the frame, as the longer the first, second and third integration times are, the longer it takes to complete activation of all the emitters and the interspaced OFF periods. In some embodiments, the frame comprises a period of time reserved as slack, so that the variation of the first, second and third integration times does not require the frame length to be altered. Preferably, the third integration time can be reused as the first integration for the next detection line recorded for the same single detector.

In a preferred embodiment, the system is configured to not alter the first, second and third integration times used by the optical touch system whilst in the data sampling mode whilst a touch interaction with the touch system is occurring. As any touch interaction will necessarily significantly alter the detected touch signal during the interaction, the results of the ambient light evaluation mode can be disregarded or postponed for use until the touch interaction has finished.

In an embodiment in which the touch system utilises multiplexing of several emitters, the main difference is that the signal captured during the ON period comes from several emitters. The ambient reduction filter works in the same way as for non-multiplexing systems. In a multiplexing system there is an extra de-multiplexing step between ambient compensation and the transmission/interpolation/reconstruction steps.

Figure 17:
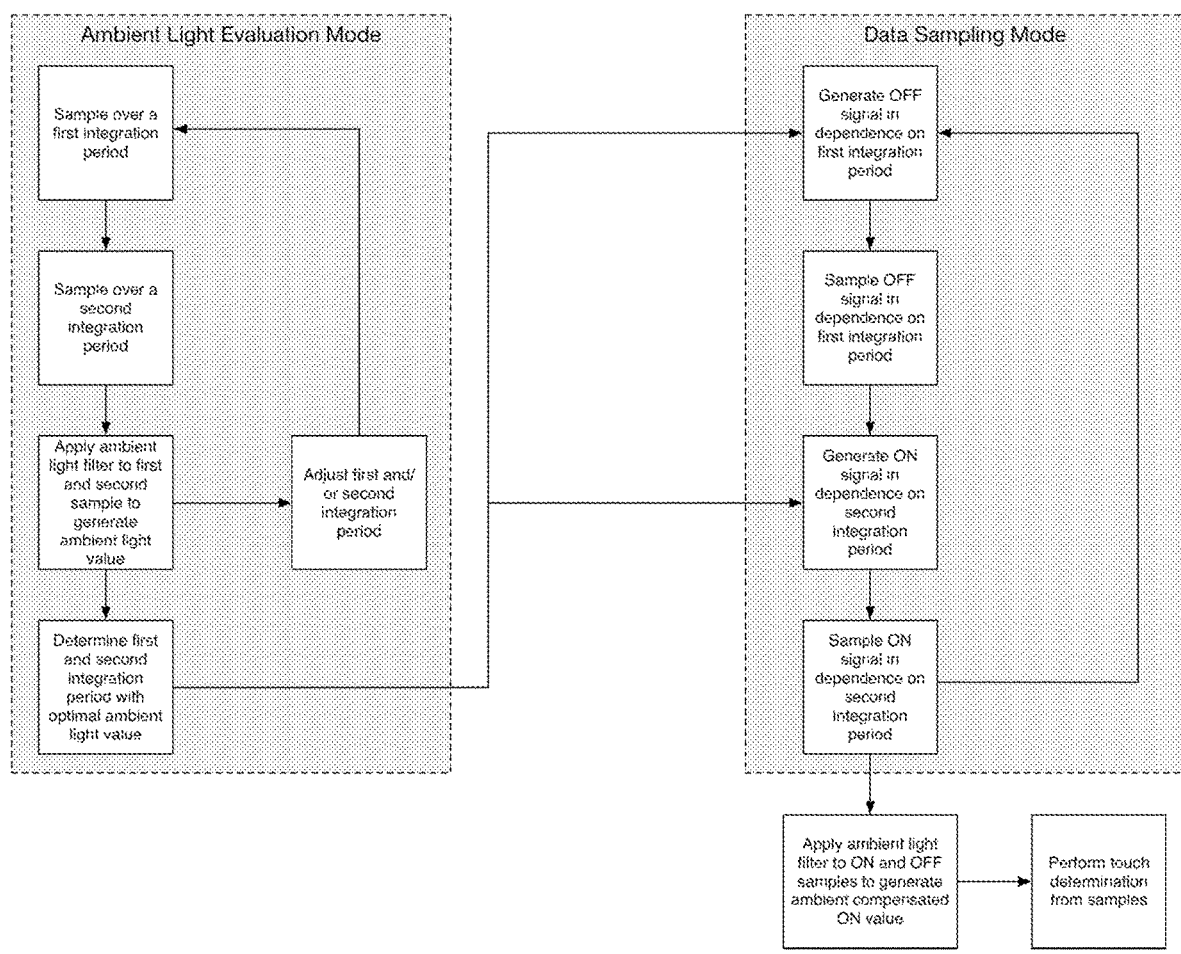
FIG. 17 is a flow chart of another embodiment of the ambient light evaluation mode and data sampling mode.

FIG. 17 shows a flow chart for a system according to a simpler variation of the embodiment shown in FIG. 16 in which two samples are recorded instead of three. According to this embodiment, the system executes the following steps whilst in ambient light evaluation mode:

1—A sample A0 is recorded over a first integration time from a single detector 30b'.

2—A sample S' is recorded over a second integration time, subsequent to the first integration time, from detector 30b'.

3—An ambient light filter function is applied to samples A0 and S' to generate a residual ambient light value.

4—Record the first integration time and second integration time and corresponding residual ambient light value in a memory as a 'filter configuration'.

5—(Repeat at least once per frame) Modify the length of the first integration time and/or second integration time and repeat steps 1-4.

6—Determine the filter configuration in the memory having the optimal residual ambient light value.

7—Operating the optical touch system in a data sampling mode using the first integration time and second integration time of the filter configuration having the optimal residual ambient light value.

The above steps will now be described in detail.

1—A sample A0 is recorded over a first integration time from a single detector 30b' substantially as described in the previous embodiment.

2—A sample S' is recorded over a second integration time, subsequent to the first integration time, from detector 30b' substantially as described in the previous embodiment.

3—An ambient light filter function is applied to samples A0 and S' to generate a residual ambient light value.

In a preferred embodiment, the ambient light filter function calculates the residual ambient light value according to the following equation:

A=Average of A0

S=Average of S'

Residual ambient light value=Magnitude of difference between A and S.

4—Record the first integration time and second integration time and corresponding residual ambient light value in a memory as a 'filter configuration'.

The data may be stored in a datastore on signal processor 12. Each filter configuration comprises a first integration time, a second integration time, and a residual ambient light value.

5—(Repeat at least once) Repeat steps 1-4 whilst modifying the length of the first integration time and/or second integration time.

Preferably, the first integration time and second integration time are the same length. Alternatively, both the first integration time and second integration time are varied in length in proportion to each other. For example, if the first integration time is made longer by 5%, the second integration time is made longer by 5% also. However, in some embodiments, the length of the first integration time may be varied independently of the length of the second integration time. Alternatively, the length of the second integration time may be varied independently of the length of the first integration time.

The number of repeats of steps 1-4 may be chosen in dependence on the number of different residual ambient light values that are needed.

6—Determine the filter configuration in the memory having the optimal residual ambient light value.

As with the previous embodiment, the optimal filter configuration may also be selected as a function of the first, second and third integration times as well as the residual ambient light value.

7—Operating the optical touch system in a data sampling mode using the first integration time and second integration time of the filter configuration having the optimal residual ambient light value.

According to the present embodiment, the system is configured to activate each emitter ON for a period of time corresponding to the second integration time. During the ON period, the system generates an ON sample value at each detector over the second integration time. The system is then configured to ensure that all emitters are OFF for a period of time corresponding to the first integration time between ON activations. During the OFF period, the system generates an OFF sample value at each detector over the first integration time. Preferably, a settling time is used between the ON and OFF periods corresponding to the rest period used between the sampling periods of the ambient light evaluation mode. An ambient-compensated energy value of each detection line is then determined to be the difference between the ON sample value and OFF sample value.

The touch determination process and the validation process according to the various embodiments disclosed herein may be implemented by a data processing device which is connected to sample measurement values from the detectors 30b, 31b, 32b. The device 140 may include an input for receiving the output signal. The device 140 may further include a data collection element (or means) for obtaining the current projection values, a generation element (or means) for generating absolute values, an interpolation element (or means) for generating a matched sinogram with absolute values, an error correction element for maintaining the relative signal transmission of affected interpolation points, a conversion element (or means) for converting the absolute values of the interpolation points into relative values, a reconstruction element (or means) for generating a current interaction pattern, and an output for outputting the current interaction pattern. The device 140 may include an input for receiving the output signal. The device 140 may further include an element (or means) for obtaining the ON values, an element (or means) for obtaining the OFF values, a compensation element (or means) for generating ambient-compensated ON values, a noise estimation element (or means) for computing a noise estimate, and a datastore.

The device 140 may be implemented by special-purpose software (or firmware) run on one or more general-purpose or special-purpose computing devices. In this context, it is to be understood that each "element" or "means" of such a computing device refers to a conceptual equivalent of a method step; there is not always a one-to-one correspondence between elements/means and particular pieces of hardware or software routines. One piece of hardware sometimes comprises different means/elements. For example, a processing unit may serve as one element/means when executing one instruction, but serve as another element/means when executing another instruction. In addition, one element/means may be implemented by one instruction in some cases, but by a plurality of instructions in some other cases. Naturally, it is conceivable that one or more elements (means) are implemented entirely by analog hardware components.

The software controlled device 140 may include one or more processing units, e.g. a CPU ("Central Processing Unit"), a DSP ("Digital Signal Processor"), an ASIC ("Application-Specific Integrated Circuit"), discrete analog and/or digital components, or some other programmable logical device, such as an FPGA ("Field Programmable Gate Array"). The device 140 may further include a system memory and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software, the exclusion data, the reference values, and any other data needed during execution, may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The data processing device 140 may include one or more communication interfaces, such as a serial interface, a parallel interface, a USB interface, a wireless interface, a network adapter, etc, as well as one or more data acquisition devices, such as an ND converter. The special-purpose software may be provided to the device 140 on any suitable computer-readable medium, including a record medium, and a read-only memory.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and the scope of the appended claims.

The invention claimed is:

1. A method of operating an optical touch apparatus, the optical touch apparatus comprising a panel,
  a plurality of emitters and a plurality of detectors arranged with respect to the panel, the plurality of detectors configured to receive light from the plurality of emitters thereby defining detection samples of light transmitted between pairs of emitters and detectors,
  a controller coupled to the plurality of emitters to generate the signals and wherein each detector is configured to generate an output signal,
  the optical touch apparatus being configured to operate in a data sampling mode operating in a sequence of repetitions, each repetition comprising the steps of:
  turning the emitters ON and OFF according to a timing configuration during each repetition such that the output signal for each detector is generated to comprise ON energy values for the detection samples and at least one OFF energy value,
  processing the output signals to generate a set of data samples, each data sample being generated to represent detected energy for one of the detection samples, and
  processing the set of data samples to detect an interaction with the panel,
  the optical touch apparatus being further configured to operate in an ambient light evaluation mode comprising the steps of:
  generating a first set of samples over a first integration time and a second set of samples over a second integration time using at least one detector, and
  applying a filter to at least the first and second set of samples to generate a residual ambient light value indicative of ambient light noise,
  wherein the method comprises the steps of:
  operating the optical touch apparatus according to the ambient light evaluation mode for a plurality of repetitions, wherein the length of at least one of the first integration time and second integration time vary between repetitions,
  selecting the first integration time and/or second integration time that generated an optimal residual ambient light value, and
  operating the optical touch apparatus in the data sampling mode with a timing configuration corresponding to the selected first integration time and/or second integration time.

2. The method of claim 1, wherein the filter is configured to generate a residual ambient light value indicative of ambient light in dependence on the difference between the second set of samples and the first set of samples.

3. The method of claim 2, wherein the optimal residual ambient light value corresponds to the residual ambient light value having the lowest magnitude.

4. The method of claim 1, wherein the first integration time is the same length as the second integration time.

5. The method of claim 1, wherein a first settling period occurs between the first integration time and the second integration time.

6. The method of claim 1, wherein the ambient light evaluation mode comprising the steps of:
  generating a first set of samples over a first integration time, a second set of samples over a second integration time, and a third set of samples over a third integration time using at least one detector, and
  applying an ambient light filter to the first, second, and third set of samples to generate a residual ambient light value indicative of ambient light noise,
  wherein the touch apparatus is configured to operate in the data sampling mode with a timing configuration corresponding to the first, second, and third integration time of the determined the ambient light evaluation mode repetition.

7. The method of claim 6, wherein the first integration time is the same length as the third integration time.

8. The method of claim 6, wherein a second settling period occurs between the second integration time and the third integration time.

9. The method of claim 6, wherein the second integration time corresponds to the integration time of the ON signal, the first integration time corresponds to integration time of the OFF signal preceding the ON signal, and the third integration time corresponds to integration time of the OFF signal following the ON signal.

10. The method of claim 6, wherein the ambient light filter is configured to generate a residual ambient light value indicative of ambient light in dependence on the difference between a signal sampled over the second integration time and an average of the signal sampled over the first integration time and the signal sampled over the third integration time.

11. The method of claim 6, wherein the ambient light filter is configured to generate a residual ambient light value indicative of ambient light in dependence on the difference between a signal sampled over the second integration time and a linear interpolation of the signal sampled over the first integration time and the signal sampled over the third integration time.

12. The method of claim 1, wherein the steps of the ambient light evaluation mode are performed once per frame, more than once per frame, or less often than every frame.

13. The method of claim 1, wherein the ambient light evaluation mode steps may be performed at the beginning, middle or end of every frame.

14. The method of claim 1, wherein the residual ambient light value is determined for a plurality of the detectors of the touch apparatus and wherein the optimal residual ambient light value is determined as a function of the plurality of residual ambient light values.

15. The method of claim 14 wherein the function is an average or maximum of the residual ambient light values.

16. The method of claim 1, wherein a total of number of different configurations of the first, second, and third integration times is greater than 2 and wherein the apparatus being configured to cycle through the total of number of configurations in subsequent ambient light evaluation mode repetitions.

17. The method of claim 16 wherein between 1 and 10 configurations of the total number of configurations are tested each frame.

18. The method of claim 1, wherein the first, second or third integration time have a length of between 3 μs to 30 μs.

19. The method of claim 1, wherein the first, second or third integration times are changed in steps of between 0.1 μs and 20 μs each ambient light evaluation mode repetition.

20. The method of claim 1, wherein the optimal residual ambient light value may also be selected as a function of the first and second integration times as well as the residual ambient light value.

21. The method of claim 20 wherein the residual ambient light value exceeding a performance threshold value and having the shortest first and second integration times may be selected as the optimal residual ambient light value.

22. The method of claim 1, wherein the system is configured to not alter the first, second and third integration times used by the optical touch apparatus whilst operating in the data sampling mode whilst a touch interaction with the touch system is occurring.

23. An optical touch apparatus comprising:
a panel,
a plurality of emitters and a plurality of detectors arranged with respect to the panel, the plurality of detectors configured to receive light from the plurality of emitters thereby defining detection samples of light transmitted between pairs of emitters and detectors,
a controller coupled to the plurality of emitters to generate the signals and wherein each detector is configured to generate an output signal,
the optical touch apparatus being configured to operate in a data sampling mode operating in a sequence of repetitions, each repetition comprising the steps of:
turning the emitters ON and OFF according to a timing configuration during each repetition such that the output signal for each detector is generated to comprise ON energy values for the detection samples and at least one OFF energy value,
processing the output signals to generate a set of data samples, each data sample being generated to represent detected energy for one of the detection samples, and
processing the set of data samples to detect an interaction with the panel,
the optical touch apparatus being further configured to operate in an ambient light evaluation mode comprising the steps of:
generating a first set of samples over a first integration time and a second set of samples over a second integration time using at least one detector, and
applying a filter to at least the first and second set of samples to generate a residual ambient light value indicative of ambient light noise,
wherein the touch apparatus is configured to perform the following steps:
operating according to the ambient light evaluation mode for a plurality of repetitions, wherein the length of at least one of the first integration time and second integration time vary between repetitions,
selecting the first integration time and/or second integration time that generated an optimal residual ambient light value, and
operating the touch apparatus in the data sampling mode with a timing configuration corresponding to the selected first integration time and/or second integration time.

* * * * *